United States Patent
Paliy et al.

(10) Patent No.: US 9,367,916 B1
(45) Date of Patent: Jun. 14, 2016

(54) METHOD AND SYSTEM OF RUN-TIME SELF-CALIBRATING LENS SHADING CORRECTION

(71) Applicants: Dmytro Paliy, Tampere (FI); Timo Gerasimow, Tampere (FI); Jarno Nikkanen, Kangasala (FI)

(72) Inventors: Dmytro Paliy, Tampere (FI); Timo Gerasimow, Tampere (FI); Jarno Nikkanen, Kangasala (FI)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 14/566,081

(22) Filed: Dec. 10, 2014

(51) Int. Cl.
*H04N 5/357* (2011.01)
*G06T 7/00* (2006.01)
*H04N 5/225* (2006.01)
*H04N 9/04* (2006.01)
*H04N 17/00* (2006.01)

(52) U.S. Cl.
CPC ............ *G06T 7/0018* (2013.01); *H04N 5/2257* (2013.01); *H04N 9/045* (2013.01); *H04N 17/002* (2013.01)

(58) Field of Classification Search
CPC .................................................... H04N 5/3572
See application file for complete search history.

(56) References Cited

U.S. PATENT DOCUMENTS

| | | | | |
|---|---|---|---|---|
| 7,834,925 B2 * | 11/2010 | Kim | ..................... | H04N 5/3572 348/251 |
| 8,089,534 B2 * | 1/2012 | Rao | ........................ | G06T 5/009 348/241 |
| 8,223,229 B2 * | 7/2012 | Nguyen | ............... | H04N 5/3572 348/229.1 |
| 8,593,548 B2 * | 11/2013 | Sun | ...................... | H04N 5/3572 348/251 |
| 8,957,998 B2 * | 2/2015 | Hyun | ................... | H04N 5/3572 348/251 |
| 2004/0257454 A1 * | 12/2004 | Pinto | ....................... | G06T 5/006 348/222.1 |
| 2009/0322892 A1 * | 12/2009 | Smith | .................. | H04N 5/2178 348/222.1 |
| 2011/0298944 A1 * | 12/2011 | Kuo | ....................... | H04N 9/045 348/223.1 |
| 2015/0070570 A1 * | 3/2015 | Tajbakhsh | .............. | H04N 9/735 348/362 |

OTHER PUBLICATIONS

DxO AutoCLS, http://www.dxo.com/intl/embedded-imaging/image-signal-processor-isp/dxoautocls, copyrighted 2003.

* cited by examiner

*Primary Examiner* — James Hannett
(74) *Attorney, Agent, or Firm* — Lynch Law Patent Group, P.C.

(57) ABSTRACT

A system, article, and method of run-time self-calibrating lens shading correction.

23 Claims, 10 Drawing Sheets

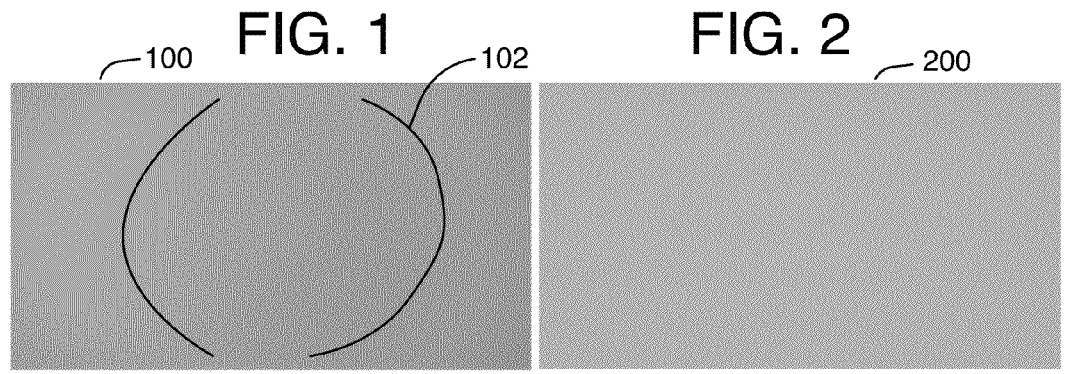
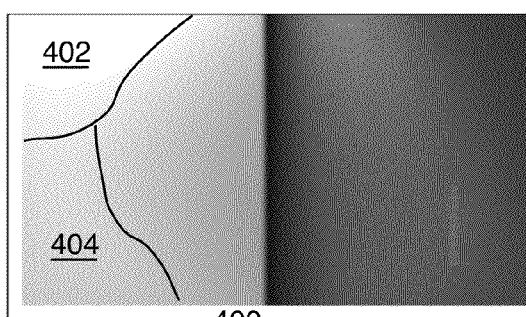
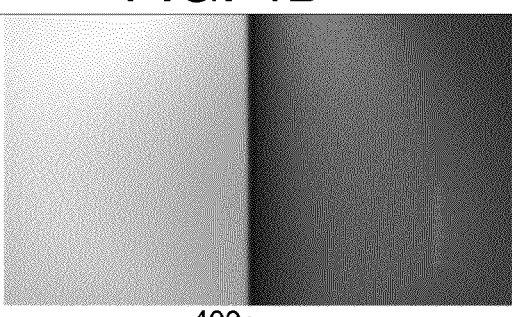
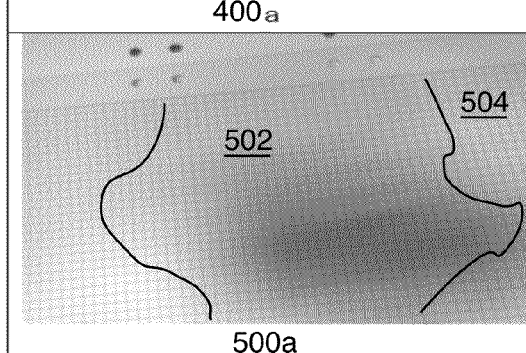
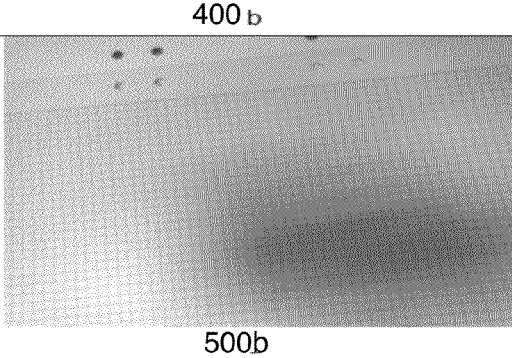

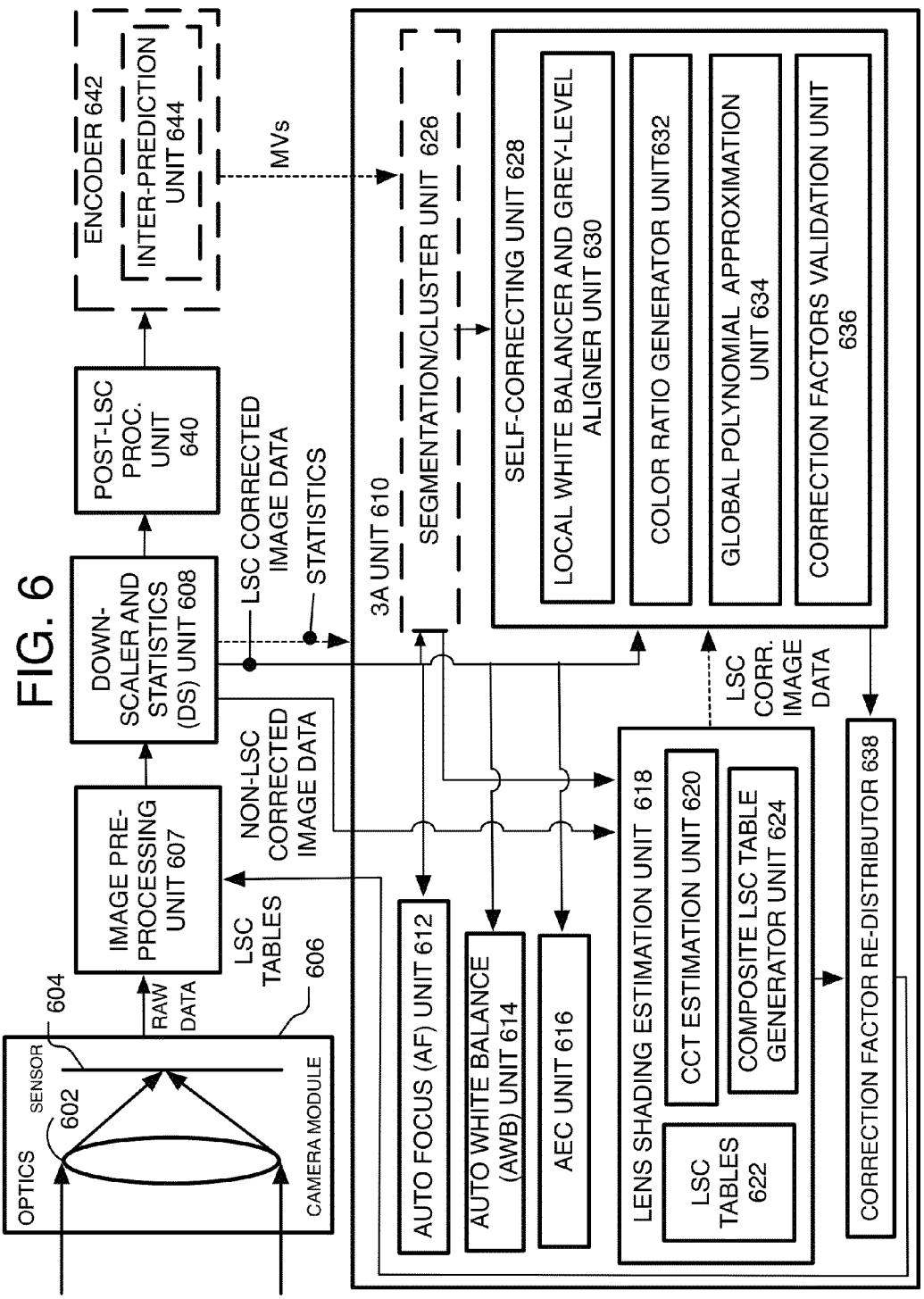

a b

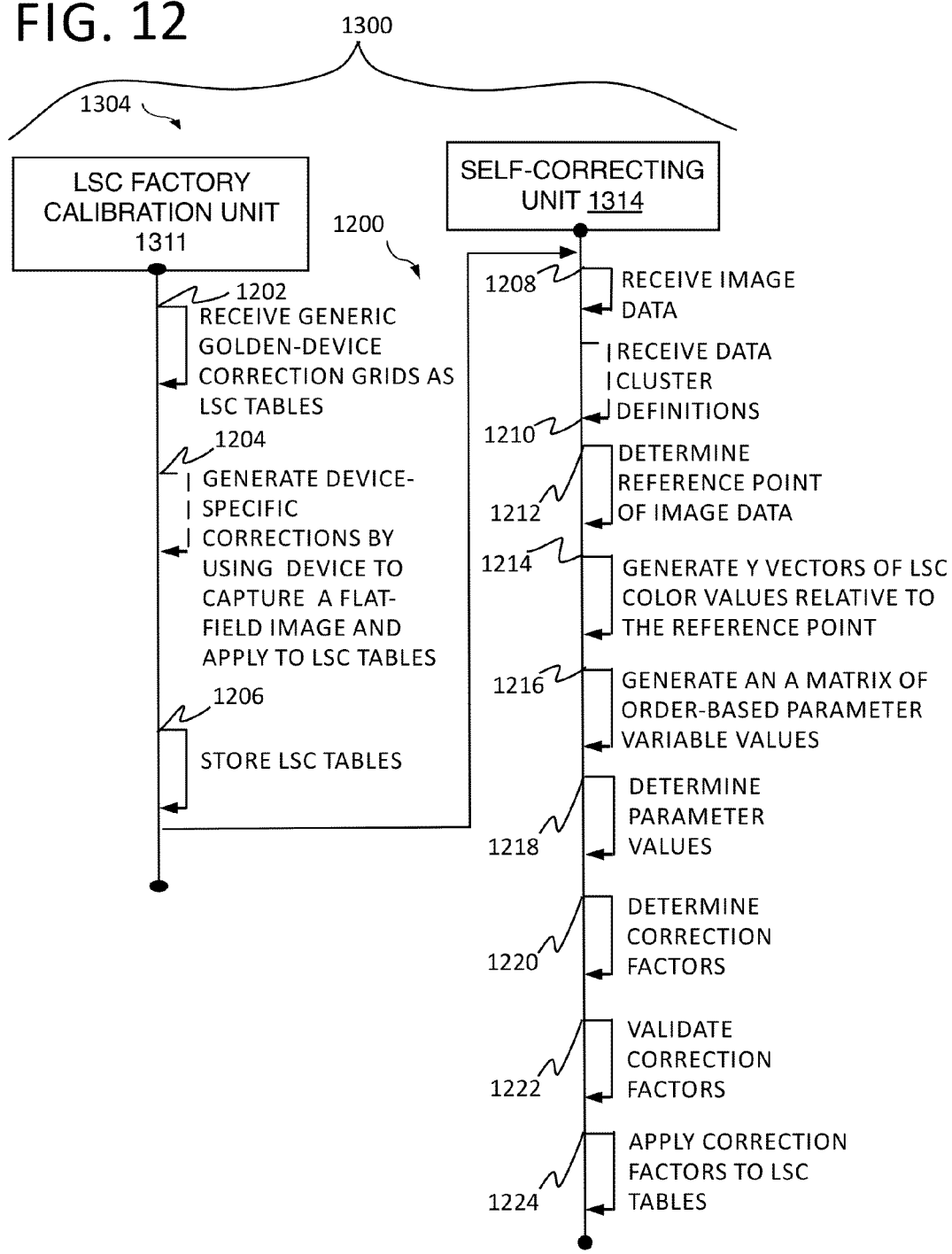

METHOD AND SYSTEM OF RUN-TIME SELF-CALIBRATING LENS SHADING CORRECTION

BACKGROUND

Electronic devices such as smartphones, tablets, and wearable computers are being miniaturized for the user's convenience, which in turn involves the miniaturization of electronic components in such devices. This includes digital cameras capable of producing digital images. While a reduction of form factors may increase user convenience, it often does so by sacrificing performance or quality. With respect to digital cameras, slimmer form factors place lenses and filters so close to the camera's sensors that resulting digital images often have color artifacts and discolorations. To add to this problem, the production of cameras or devices with camera modules may have different color artifacts from device to device due to individual differences caused by manufacturing tolerances for example.

To resolve these issues, the conventional manufacturing processes include lens shading correction calibration that provides the same generic lens shading correction grids for a large number of individual devices to at least compensate for an average distortion. The generic correction grids, however, often result in lower quality images. To resolve this issue, higher end products also have independent production line lens shading correction calibration that individually modifies the generic grids for each individual device before the device is provided to an end user. These calibration processes, however, may be costly, labor intensive, and/or difficult to implement such that lens shading correction calibration may not provide a sufficient reduction in artifacts or may even result in worse artifacts. Thus, better quality digital images without production line lens shading correction calibration that is cost effective even for less expensive products is desired.

DESCRIPTION OF THE FIGURES

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 1 is an illustration of an image after lens shading correction without device-specific calibration information with light attenuation and color artifacts;

FIG. 2 is an illustration of an image with ideal lens shading correction;

FIG. 3 is an illustration of an image formed by the run-time self-calibrating lens shading correction methods disclosed herein;

FIG. 4A is an illustration of an image formed without device-specific lens shading correction;

FIG. 4B is an illustration of an image formed with the run-time self-calibrating lens shading correction methods disclosed herein, and using the data forming the image of FIG. 4A;

FIG. 5A is an illustration of a complex image formed without device-specific lens shading correction;

FIG. 5B is an illustration of a complex image formed with the run-time self-calibrating lens shading correction methods disclosed herein, and using the data forming the image of FIG. 5A;

FIG. 6 is a schematic diagram of an image capture device for lens shading correction;

FIG. 12 is a diagram of an operation of an example system described herein;

DETAILED DESCRIPTION

Figure 7:
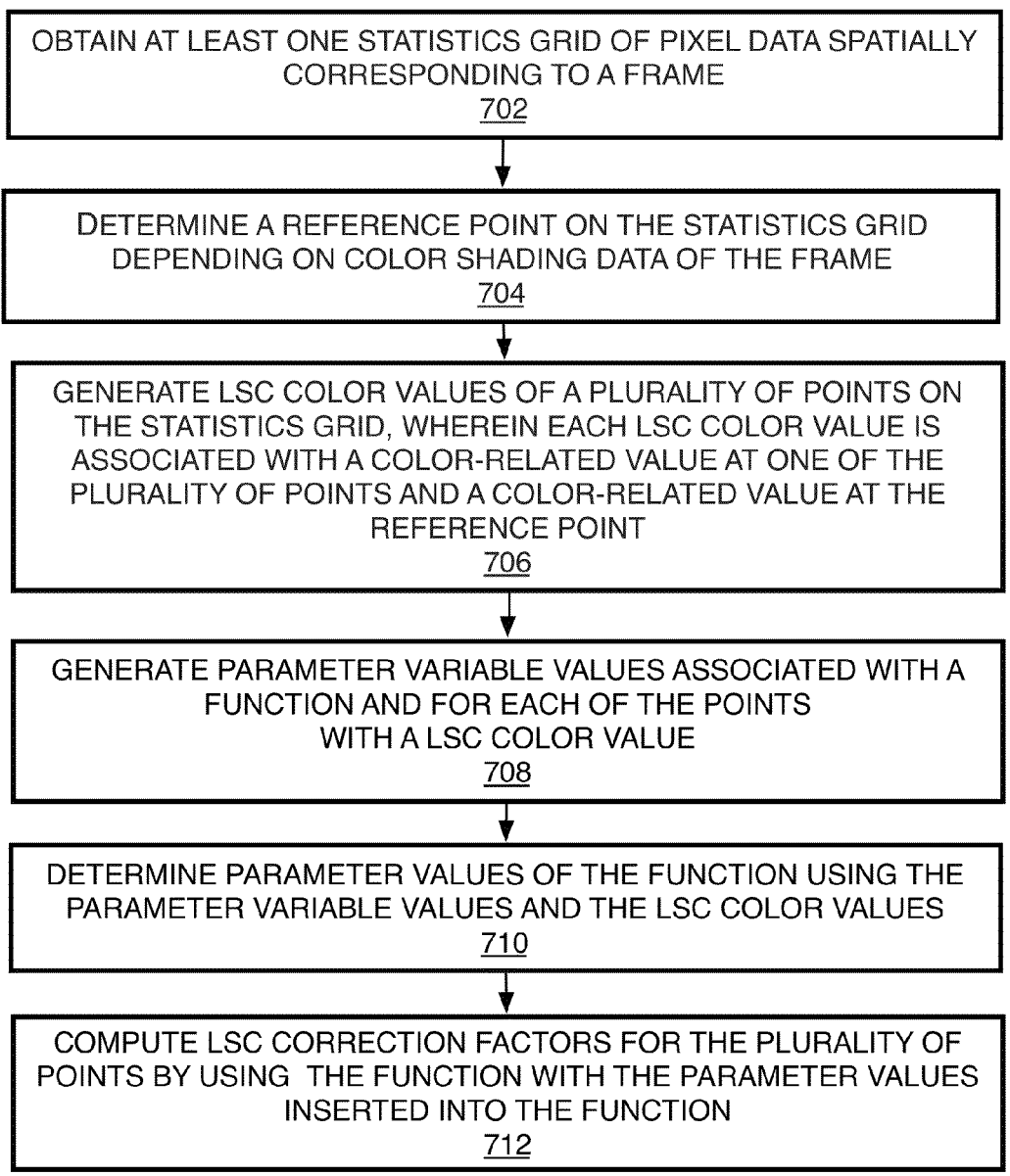
FIG. 7 is a flow chart showing a lens shading correction process.

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as imaging devices, digital cameras, smart phones, webcams, video cameras, video game panels or consoles, set top boxes, and so forth, may implement the techniques and/or arrangements described herein. Further, while the following description may set forth numerous specific details such as logic implementations, types and interrelationships of system components, logic partitioning/integration choices, and so forth, claimed subject matter may be practiced without such specific details. In other instances, some material such as, for example, control structures and full software instruction sequences, may not be shown in detail in order not to obscure the material disclosed herein. The material disclosed herein may be implemented in hardware, firmware, software, or any combination thereof.

The material disclosed herein may also be implemented as instructions stored on a machine-readable medium or memory, which may be read and executed by one or more processors. A machine-readable medium may include any medium and/or mechanism for storing or transmitting information in a form readable by a machine (for example, a computing device). For example, a machine-readable medium may include read-only memory (ROM); random access memory (RAM); magnetic disk storage media; optical storage media; flash memory devices; electrical, optical, acoustical or other forms of propagated signals (e.g., carrier waves, infrared signals, digital signals, and so forth), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", and so forth, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods to provide run-time self-calibrating lens shading correction.

A multi-function electronic device that has the ability to capture images such as a smartphone, mobile phone, tablet, laptop, and so forth with a mobile camera module may often have a form factor with dimensions sized to easily fit in a palm of an average hand of a user. In such cases, the small electronic device may have a depth so small it may be measured in millimeters (mm). For instance, conventional smartphones may easily have a representative depth of 7.6 mm or thinner. When a device of such narrow depth incorporates an image capture module, such as a digital camera, it necessarily decreases a distance between camera optics and an image sensor. The decreased distance causes light to strike various portions of the image sensor in a non-uniform manner, such as concentrating light towards a center of the image sensor and attenuating light towards the outer edges of the image sensor. This attenuation may not be static throughout color planes which results in severe color distortions. Typical results are digital images that are brighter in the center and darker near the edges as mentioned, as well as artificial colors, and attenuation with respect to the original scene.

More specifically, since a majority of digital imaging sensors are equipped with CFAs (color filter arrays) to reproduce color information in digital images, as a result, such attenuation varies in different color channels, which results in severe color degradation when the image is reconstructed improperly. This attenuation varies depending on light spectrum, module design (geometry and optics), IR-cut-off (infrared) filter, sensor design, and potentially other factors. For one factor, when the optics (or filter) and sensor plane are brought closer together in these small devices, this creates a relatively sharp chief ray angle (CRA) relative to the sensor plane, and depending on the design of the part that holds the sensor, not as many light rays compared to some ideal arrangement may have a clear path to the sensor. Importantly, since the attenuation depends so heavily upon the exact dimensions and assembly of the components of an individual camera or device, each device may have different distortions that should be compensated for independently. Also, since such distortion can be measured objectively, and it is visible to users, the removal of these distortions is an important criterion for image quality. For instance, FIG. 1 discloses an uncalibrated image 100 with color artifacts such as a brighter light blue in the center area 102 and darker purple near the corners of the image. In contrast, FIG. 2 discloses the ideal target image 200 of the image and the result after excellent calibration providing a substantially completely grey image with even illumination through-out the image.

To correct for such non-uniformity, an image capture device may implement various lens shading correction (LSC) algorithms to compensate. The terms lens shading correction and LSC may be interchangeably referred to as lens shading color correction herein. An LSC algorithm may utilize one or more LSC tables with correlated color temperature (CCT) factors associated with them to perform such correction. Once an LSC table is formed (or more accurately selected among pre-stored LSC tables (also referred to as correction grids)), it is applied to pre-processed image data to make the corrections before the data is provided to an encoder or before the image is displayed for example.

In more detail, LSC comprises a number of stages that affect image quality: first, pre-production generic characterization of camera modules forms the same generic correction grids provided to each device. For some product lines, device-specific or individual calibration of each device is then performed along the production line and that modifies the generic correction grids to form device-specific correction grids (or LSC tables) stored on the device and to compensate for device-specific color variations. Second, camera run-time correction (i.e., while the device is being used) is performed where the run-time correction may entirely rely on the quality and correctness of the pre-stored correction grids.

The generic correction grids are formed using a golden device, i.e., those modules or devices that most likely possess common properties in terms of lens shading or the "ideal" modules or devices, and are created by using the golden device to capture an image with even luminance (flat field image) for one or two different types of illuminant sources, and under very carefully controlled lighting arrangements. The values forming the correction grids are based on raw image pixel values such as luminance values, the Bayer color channels, or ratios thereof. Typically, the same generic correction grids of the golden device are then stored on multiple individual devices.

Thereafter, for the products with production line LSC calibration, which are typically higher end products, a similar operation may be performed for the current device being manufactured and calibrated as that performed for the golden device. Thus, each device or sample is used to capture a flat field image with even luminance under very carefully controlled lighting conditions. The resulting pixel values from capturing the flat field image are then compared to those of the generic correction grids, and a difference (or delta or residual error) is measured. These product line calibration measurements are then stored as sample-specific residual errors or deltas (or correction factors) into camera module Non-Volatile Memory (NVM). Thus, this approach is often called NVM-based LSC. Upon camera initialization, the correction factors are read from memory of a module or device, and applied to the generic LSC grids specifically generated from the golden device to form device-specific correction grids (or LSC tables) before providing the modified LSC tables for application to image data for processing an image. The correction factors stored when calibrating are estimated for one or two light sources.

The NVM-based LSC calibration carried out on the production line to compensate sample-to-sample variations, has two problems: it is costly and prone to errors. The production line calibration is costly because it may involve diverting each sample or device to an LSC calibration location in a factory, or other location, and to provide carefully controlled conditions for capturing the flat field image from each individual device. In addition to the equipment costs, the setup and capturing of these images also may require significant manual labor.

The factors that add errors to the production line data (that is to be stored in each image capture device for example) is often related to the precise conditions needed to use the individual devices to capture a good quality flat field image. To name a few possible examples, this may include a change in luminance during the calibration image capture due to the aging of the light source, difference between light sources in different parallel production lines, and variations or settings in the power source voltage. Otherwise, ambient light in the surrounding area may not be controlled or eliminated properly, and human error may occur such that the calibration data may be stored in incorrect data formats at the capture devices, or testing procedures are not carried out correctly.

These problems are most severe when using Front Side Illuminated (FSI) sensors and reflective Infra-Red Cut Filters (IRCF) camera module components, which are exploited in a wide range from low-tier to high-tier mobile devices. LSC is a pre-processing step for most of camera control, color correction, and image restoration algorithms. It sets significant implications on performance of Auto White Balance (AWB) and Auto Exposure Control (AEC). Additionally, the currently available solutions for calculating the correction factors for the device-specific LSC calibration is often based on a single light source (most usual setup) used in calibration. Afterwards, device-specific correction information about the calibration light is extrapolated for all other light sources stored in device configuration and reused to compensate the generic correction grids. This may lead to under- or over-correction for other, different light sources relative to the calibration light sources.

To eliminate these disadvantages, the system and method disclosed herein may omit production line LSC calibration, and add automatic calibration functionality to each device to perform device-specific adjustment of correction grids during camera run-time. This self-calibration or self-correcting may be referred to herein as post-processing or post-processing calibration, while images that received independent device production-line LSC calibration may be referred to as pre-corrected images.

By one approach, a post-processing algorithm is used to analyze scenes after only LSC correction using generic correction grids. By another example, the post-processing occurs after pre-corrected images are formed. In the latter case, the input observation data for the post-processing uses red over green and blue over green color ratios of the pre-corrected image. Then, the system generates residual factors specific to each camera module and light environment. This is achieved as a result of parameterization of spatially distributed color distortion data. Nearly perfect correction may be achieved by reverting this parameterization function similar to the results that may be obtained by using diffusive glass to capture an ideally flat image. FIG. 3 shows such a resulting image 300 using the LSC self-calibration methods described herein, and which looks very close to the ideal result of FIG. 2, with a grey color and substantially even luminance through-out the image.

Additionally, complex scenes in generic images require more complex data analysis, which may be achieved by data clustering or forming clusters of blocks that indicate similar smooth areas of an image as described in greater detail below, so that the post-processing algorithms can be applied to those clusters, which are highly susceptible to the color artifacts. Otherwise, automatic independent LSC self-calibration does not affect functionality of other camera module samples, and the LSC calibration forms results close to what is expected as on the standard evaluation target image 300 (FIG. 3).

Referring to FIGS. 4A-4B and 5A-5B for further examples, an image 400a has content that includes a generic scene without any LSC calibration. The images 400a-400b and 500a-500b are provided after white-balancing for visualization purposes. The image 400a has color artifacts such as a white upper-left corner 402, a grey lower left corner 404, and a grey-blue-green center-right part, and a maximum change in color $\Delta C=8.65$ (change from an ideally corrected image). The self-calibrated image 400b using the data of image 400a as input has a more even blue-grey field with a smaller upper left white area showing much more consistent and uniform colors with a max. $\Delta C=5.66$.

Similarly, image 500a is a non-self-calibrated image of a generic complex scene such as a picture of a table with alternating patterns of black and white. The pre-corrected image 500a has artifacts including green-blue shading on the middle 502 and reddish shading on the right 504 for a max. $\Delta C=7.77$. Instead, the self-calibrated image 500b, using the data from image 500a as input, and using the methods described herein appears to have correctly eliminated the color shading and has a max. $\Delta C=2.42$, where a value above 1.0 typically refers to visible to the human eye.

The disclosed run-time self-calibrating LSC method and systems described below may provide better quality images both for higher-end devices that have independent production-line LSC calibration as well as low cost segment products, such as some wireless platforms, where such independent production-line LSC calibration is too costly. Also, the self-calibrating LSC method and system may be a more robust system with less image quality and manufacturing problems in contrast to the production line calibration which uses measurements proven to be very error-prone, and the different vendors that provide the production-line LSC camera calibration modules may provide different quality and expertize, thereby providing a large difference in product quality.

Referring now to FIG. 6, an image capture device or system 600 to process captured images and apply run-time self-calibrating lens shading correction is described. The image capture device 600 may be a stand-alone device, such as a digital camera, or may merely be a camera module on a device such as a smartphone. In the present example, the image capture device 600 may have a camera module 606 that has optics 602 and one or more image sensors 604, where each optic is paired with a corresponding image sensor 604. Each of the image sensors 604 may be based on any of a variety of technologies for capturing an image of a scene, including, but not limited to, charge-coupled device (CCD) semiconductor technology. Each of the optics 602 is made up of one or more lenses, mirrors, prisms, shutters, filters, etc. employed to convey images of a scene and to at least partly define the field of view of corresponding ones of the image sensors 604. The image sensors 604 and the optics 602 (whatever their quantity) are positioned and oriented relative to each other in a manner intended to provide each image sensor and optics pair with a field of view that overlaps field(s) of view of one or more of the other image sensor and optics pairs.

The image capture device 600 also may have a pre-processing unit 607 that receives raw image data from the camera module 606 and performs black-level correction on the raw image data, upscales a LSC correction grid (or table) received from a lens shading estimation unit 618 described below, and upscales the grid to the size of the image data, and multiplied in a point-wise manner.

A downscaler and statistics (DS) unit 608 will then use the LSC corrected image data to generate statistics for 3A, which comprises LSC corrected, AF statistics for auto-focus, and black-level corrected raw statistics. Thus, the DS unit 608 may provide the LSC corrected data to a 3A unit 610 for 3A corrections, the LSC self-calibration, and when provided, for block matching and cluster formation to identify smooth areas of an image as described below. The DS unit 608 also may provide the black-level corrected raw image data to the lens shading estimation unit 618 for application of candidate LSC tables and lens shading estimations, and ultimately for generation of a final composite LSC table to be used for image correction. In systems that do not provide the black-level-adjusted data to the 3A unit, the LSC corrected data from the downscaler may be reverted before it is used in lens shading estimation. The reversion may be performed by the downscaler or a separate module for such purpose. The DS unit 608 also is provided to downscale the raw data stream (or raw image information) from the camera module 606, and analyze the downscaled image data to form statistics that may be used by the 3A unit 610. At the very least, the pre-processed image data should already be processed for black-level correction before lens shading estimation operations may begin. Lens shading estimation unit 618 expects statistics to be black-level corrected only. Hence, if the DS unit 608 assumes only one type of statistics as an output, which is LSC-corrected, then this correction shall be reverted and used as input to system 618 as mentioned above. Other 3A units may use LSC-corrected or AF statistics, or both. The pre-processed image may be a single image, or a sequence of images, such as from a video sequence. The preprocessed image may be received by the LSC estimation unit 618 in real-time, or in non-real time from a memory unit. Implementations are not limited in this context. Note that pre-processing and post-processing discussed herein are relative to the LSC shading estimation.

The 3A unit 610 has an automatic focus (AF) unit 612 to perform AF calculations to determine factors to move a camera lens into focus. An automatic white balance (AWB) unit 614 is provided to perform calculations to image data for white balance, and an automatic exposure (AE) unit 616 to provide factors to adjust exposure time for capturing an image. The 3A unit 610 also may or may not have the lens shading estimation system or unit 618.

The LSC estimation system or unit 618 may use a correlated color temperature (CCT) estimate unit 620 to determine which of a set of candidate LSC tables (correction grids) 622 are to be used for lens shading correction for a current image. Specifically, a characterization phase is performed during design and assembly of the image capture device 600 before a correction phase. In the characterization phase, LSC tables 622, in the form of generic correction grids, are created to cover most CCT value ranges for commonly used illuminants. The LSC tables 622 are stored in a memory, such as a persistent storage, for later use during the estimation and correction phases. While production-line calibration may be eliminated with use of the post-processing self-calibration described herein, by one alternative approach device-specific LSC production-line calibration still also may be performed to form initial flat field image correction factors. The correction factors may be stored on the device to adjust the LSC tables upon initialization of the device, or the LSC tables already identified for a specific device may be adjusted by these initial device-specific correction factors before the LSC tables are stored on the target device. Thus, the role of estimation unit 618 is to decide when, and in which proportion, each candidate LSC table 622 should be used to compensate shading of a digital image, and where an LSC table is selected for each type of illuminant that is found to be present in an image. Ultimately, the lens shading estimation unit 618 provides a composite LSC table to be used to correct the image that is being processed.

A correction phase may be performed in real-time, or run-time execution during use of the image capture device 600, and when data is streamed from the camera module 606. During the correction phase, the 3A unit 610 via the DS unit 608 may analyze the content from the streamed image data, and supplementary metadata. Examples of metadata may include, without limitation, auto-focus values, CCT estimate, time values, and so forth. The relevant data is provided to the 3A unit 610 by the DS unit 608. During the correction phase, the CCT estimate unit 620 is used to estimate one or more original light source types and initial selection of candidate LSC tables.

Also during the correction phase, and by one option, a segmentation/cluster unit 626 may determine which blocks in a frame are positioned within clusters that indicate a flat and smooth area of an image. The block selection unit 626 also may be referred to as a block matching unit, segmentation unit, or clustering unit as well. It also will be appreciated that the device 600 may have at least one LSC unit to perform the operations of the LSC estimation unit 618, a self-correcting unit 628, and the block selection unit 626, such that units 618, 628, and 626 may be considered as part of one LSC correction unit, or any other variation. The block selection unit 626 may receive AF statistics, and provides approximation of flat smooth areas in the scene by using the AF statistics. The block selection unit 626 may output definitions of block clusters that represent the smooth areas. This may include a total area of the cluster (total number of pixels in the cluster) as well as the coordinates of the data in the cluster on an image. The coordinates may be used to obtain the hue and saturation values for the data in the cluster. Each image may have one or more clusters. The total amount of pixels from all of the clusters in an image should contain a sufficient amount of image data to provide a robust estimate of deviation between color samples. For example, one threshold may be a recommended minimum of 100 pixels or other relevant value, or may be that the smooth areas must cover at least 40% of the image.

The locations of the clusters may then be provided to both the composite LSC table generator unit 624 of the lens shading estimation system 618 and the self-correcting unit 628. The image data from these clusters then may be used by the composite LSC table generator unit 624 to form the composite LSC tables, and used by the self-correcting unit 628 to compute LSC correction factors to be applied to the LSC tables. The details of the cluster forming and their use, as well as details of LSC composite table formation using illuminant-based weights for LSC candidate tables, are provided by U.S. patent application Ser. Nos. 14/182,284, and 14/498,271 having U.S. Patent Application Publication Nos. 2015-

0355323A1 and U.S. Pat. No 9,186,909, which are incorporated by reference herein at least for the relevant parts of those applications, but also in their entirety. The description below provides the details of the clusters that are relevant to the run-time self-calibrating system and methods described herein.

As to the formation of the LSC composite tables, the composite LSC table generator unit 624 receives the identity of the set of the initial LSC tables for $Light_1, \ldots, Light_L$ for example as well as the image data of the blocks in the established clusters of an image when such clusters are provided. The composite LSC table generator unit 624 then performs grey-world white-balancing (GW-WB) at least on the LSC corrected image data of the clusters if not the whole image or other specified area, and which may be controlled by the AWB unit 614. The composite LSC table generator unit 624 then may convert the red/green/blue (RGB) values to hue/saturation/value (HSV), and calculate an error value for each cluster and for each illuminant. By one approach, input statistics such as the cluster size, and hue and saturation values, may be used to determine the error values. Separately, the composite LSC table generator unit 624 also may calculate a confidence value for each cluster by one example. The error values and corresponding confidence values may be used to generate a weight (wl to wL) for each initial (or candidate) LSC table assigned to each illuminant. The initial LSC table data is then adjusted by using the weight for the table, and then summing (or fusing) all of the LSC tables from all of the illuminants into a single composite LSC table for an image.

The self-correcting unit 628 is provided to generate correction factors during run-time, or at least during an initial use of the image capture device, rather than requiring a production-line device-specific process of capturing a flat field image for providing the correction factors. By one approach, the self-correcting unit 628 determines correction factors at the beginning of the correction phase the very first time the device is used for example, and with the first frame to be analyzed and corrected. The correction factors may be provided to a correction-factor re-distributor 638 to adjust the values of the composite LSC tables before the LSC tables are used to correct the images being processed. The correction factors then may be stored to adjust the candidate LSC tables, and/or the LSC composite table, going forward.

In more detail, the self-correcting unit 628 may receive statistics and image data for smooth clusters when present, but otherwise the whole image or other part of the image as desired. The image data is provided to a local white balancer and grey-level aligner unit 630 for white balancing of the image data. A color ratio generator unit 632 then generates color ratios that may be used for the correction factor computations. This may include Bayer filter-based $\{R, Gr, Gb, B\}$ ratios such as R/G, B/G, and a computation to obtain G=(Gr+Gb)/2 for at least the image data in the clusters. A global polynomial approximation unit 634 then performs a number of routines to calculate the correction factors. This includes finding a reference point related to attenuation on the image (such as a point in a cluster closest to the optical or geometric center of the image and assumed to be a point of least attenuation). Then, LSC color values for multiple points in the image, or clusters, is computed. This is a value that relates each color ratio at multiple points to the color ratio of the reference point. Thereafter, parameter variable values are formed, and this may include forming a matrix of parameter variable values for each point of the image or clusters being used with the LSC color ratio values. Each variable value is the variable that corresponds to (or to be multiplied by) a parameter in a function in the form of a polynomial equation. This is explained in greater detail below.

The LSC color values and the parameter variable values are then used in an equation to determine the parameter values. Once determined, the parameter values are inserted into the polynomial equation of the function, and the function is applied to each image point in the image, or clusters, to determine the correction factor for that point. A correction factor validation unit 636 then may determine which correct factors are valid (depending on the sign (positive or negative) of the parameters for example) or whether the correction factors are above a certain threshold or within a certain range by other examples. The valid correction factors are then stored and provided to the correction factor re-distributor 638 to apply the correction factors to the candidate LSC tables, or the LSC composite tables, going forward for example. The composite LSC table corrected by the run-time self-calibration correction factors are then provided to the image pre-processing unit 607 for application to the image for further processing.

Then, the pre-processed, LSC corrected image then may be provided, via the DS unit 608, to a post-LSC processing unit 640 that may perform tasks such as noise reduction, pixel linearization, resolution reduction, Bayer demosaicing, and/or vignette elimination as well as other tasks, and an encoder 642, which may compress the data for transmission in a bit stream or for storage on an image readable media.

By one option, the encoder 642 may have an inter-prediction unit 644 that generates motion vectors (MVs) to determine the motion of blocks from frame to frame in a video sequence of frames forming the images. In this case, the motion vectors, or the new locations for blocks in subsequent frames, may be provided to the block selection unit 626, when available, so that the computational load for statistics is reduced at least for ongoing composite LSC table generation. The self-calibration also may use the motion-based clusters even though the self-calibration may be only used once upon initialization during first use of a device (and in this case, after at least one previous frame with clusters). Alternatively, the self-calibration, and use of the clusters therefore, may be performed each time the device is turned on, or even more frequently when computational capacity is provided.

Referring now to FIG. 7, by one approach an example process 700 is a computer-implemented method of run-time self-calibrating lens shading correction that may be used to correct image data. In the illustrated implementation, process 700 may include one or more operations, functions or actions as illustrated by one or more of operations 702 to 712 numbered evenly. By way of non-limiting example, process 700 may be described herein with reference to example image capture devices 600 and 1300 of FIGS. 6 and 13 respectively, and where relevant.

Process 700 may include "obtain at least one statistics grid of pixel data spatially corresponding to a frame" 702. This may include obtaining the Bayer filter color values of an image or frame of image data, and by one example, a statistics grid of color ratios and the coordinates of the points on the statistics grid. Herein, the terms frame and image may be used interchangeably depending on the context.

This process 700 also may comprise "determine a reference point on the statistics grid depending on color shading data of the frame" 704. By one example, this may include designating a point on the image or frame, and particularly a point of the statistics grid for the image, as the reference point and that has, or is assumed to have, the least attenuation. If there are points that have the same or similar lowest attenuation such as with a flat field image, then among these points, the point closest to the optical or geometric center of the statistics grid is used as the reference. Otherwise, the reference point may be taken from one or more clusters of smooth uniform areas defined on the image if so provided. In this case, the closest point in the cluster or clusters closest to the optical or geometric center of the image is assumed to have the least attenuation in the image and is selected as the reference point for the LSC computations for the image.

The process 700 may include "generate LSC color values of a plurality of points on the statistics grid, wherein each LSC color value is associated with a color-related value at one of the plurality of points and a color-related value at the reference point" 706. By one example form, the LSC color values are determined from white-balanced data, and by one example, limited to the points associated with flat smooth areas of the image. By one approach, the data may be limited to the defined clusters. The color-related values may be color ratios, and the LSC color value of each point may be computed as a color ratio at the point (red/green or blue/green) over a color ratio of the reference point (the corresponding red/green or blue/green ratio for example). Green here may be the average green value of two green values of the Bayer filter by the present example.

As explained below, process 700 also may include "generate parameter variable values associated with a function and for each of the plurality of points with a LSC color value" 708. By one form, this may include forming a matrix 'A' where each row or column is associated with one of the points (and by one example, a point from one of the defined clusters), and the other of the column or row are the parameter variable values by order and position of the variable value in the function as they correspond to the parameters. The parameter variable values are determined by using the horizontal, vertical coordinates ($x_1$, $x_2$) of the corresponding point having an LSC color value. Thus, for explanation, if a function $P_1 x_1 + P_2 x_2^2$ has parameter variable values $x_1$ and $x_2^2$ that correspond respectively to parameters $P_1$ and $P_2$ and form a column in the matrix. The parameter variable values may be determined for each point with an LSC color value by inserting the statistics grid coordinates of the point into the variable in the matrix. Many different functions may be used. Here, equation (15) below provides the present example function being used.

Process 700 also may include "determine parameter values of the function using the parameter variable values and the LSC color values" 710. By one example, the LSC color values are formed into a vector Y as the product of the 'A' matrix of parameter variable values multiplied by a vector b of the parameters from the function so that Y=Ab. An equation is then provided, such as equation (17) below, to solve for the parameters.

Process 700 may include "compute lens shading correction (LSC) factors for the points by using the function with the parameter values inserted into the function" 712. Thus, the function of equation (15) may then be used with the computed parameter values inserted into the equation. The coordinates of a point are inserted into the equation to determine a correction factor for that point. After being validated, the correction factor may be proportionally applied to LSC tables that each correspond to a different type of illuminant as explained below.

Figure 8:
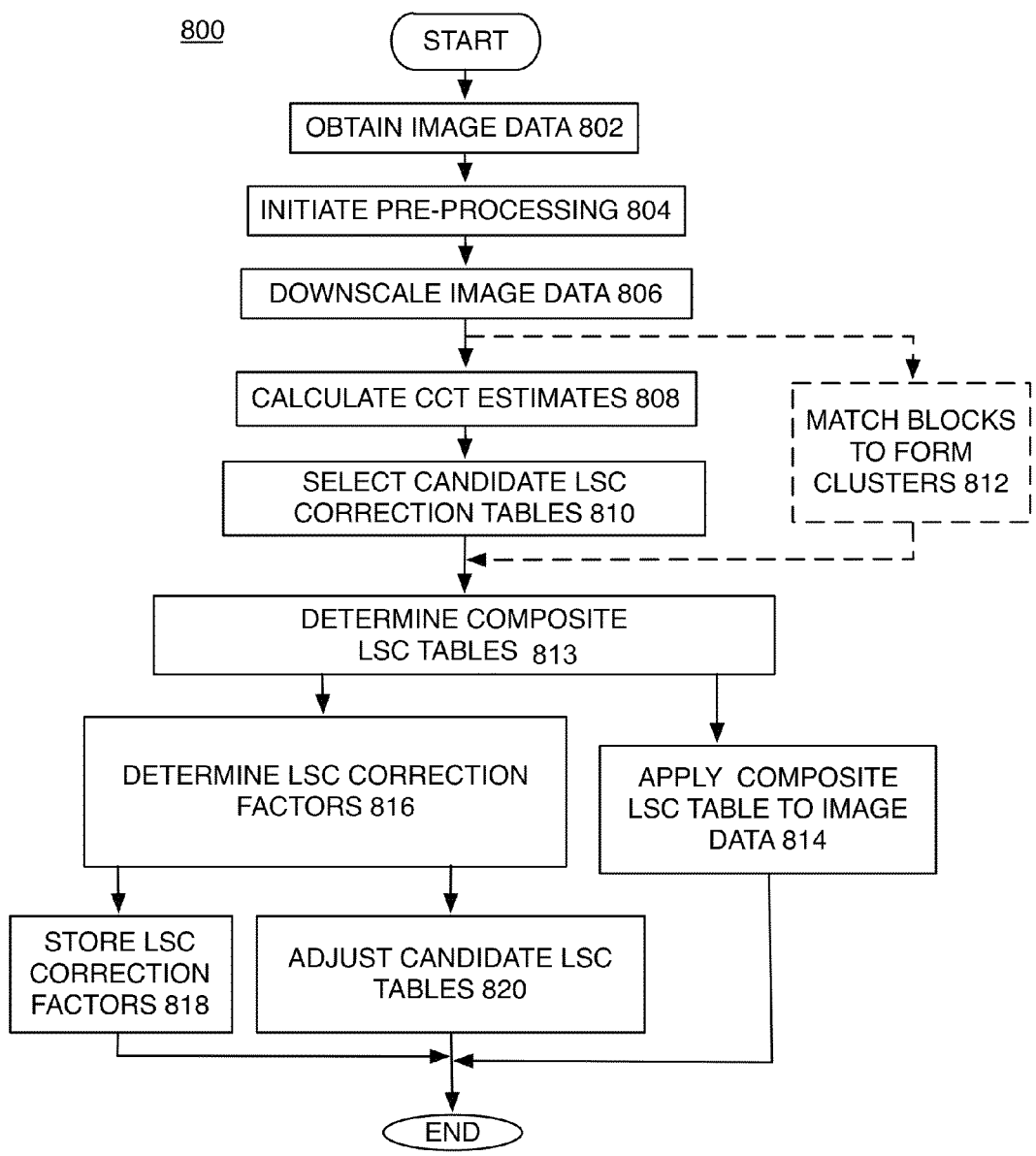
FIG. 8 is a flow chart of a detailed lens shading correction process.

Referring now to FIG. 8, a more detailed run-time self-calibrating lens shading correction process 800 described herein is arranged in accordance with at least some implementations of the present disclosure. In the illustrated implementation, process 800 may include one or more operations, functions or actions as illustrated by one or more of operations 802 to 820 numbered evenly. By way of non-limiting example, process 800 will be described herein with reference to example image capture devices 600 and 1300 of FIGS. 6 and 13 respectively where relevant.

Process 800 may include "obtain image data" 802, and as explained above may include obtaining raw image data streamed from a camera module or other image capture module. The camera module, such as camera module 606, may be part of a single image capture device that includes the disclosed lens shading correction system, or it may be remote from the disclosed system.

Process 800 may include "initiate pre-processing" 804. This may include black-level and lens shading corrections. As mentioned above, by one approach, black-level correction is performed on an image being analyzed before the following lens shading correction operations take place with regard to that image.

Process 800 may then include "downscale image data" 806 to reduce the amount of image data to a uniform, controllable amount, such as a grid of data (corresponding to pixel locations) to form a 39×51 image for a smartphone for example. Such downscaling may be performed by using standard sampling techniques.

Process 800 may include "calculate CCT estimate" 808. As mentioned above, pre-processed image content may be obtained, and a set of initial or candidate LSC correction tables may be selected 810 for correcting a current image being analyzed where there will be a different LSC correction table for each possible type of illuminant that is found to be potentially present. The LSC correction tables may be generic correction grids formed using a reference device (or golden device) to capture an image with even luminance (flat field image) for a number of different types of illuminant sources. The values forming the correction grids are based on raw image pixel values such as the Bayer color channels, or ratios thereof. The generic correction grids are then stored on the image capturing device. By one form, these generic correction grids are used as the candidate LSC correction tables going forward without the necessity of production-line device-by-device calibration as explained below.

By another form, production-line self-calibration is still performed. In this case, a flat field image also is captured with the current device, and the data is used to make corrections on the candidate LSC tables. For this operation, the gain for multiple sample pixel points on the image may be determined. The individual gains for multiple points may be compared to an average or maximum color value for example, and the differences then may be stored on the device as initial correction factors, and applied to the values on the candidate LSC tables upon initialization of the device.

The candidate LSC tables may be selected for a current frame by first analyzing image content and by calculating a probability CCT (PCCT) of presence of illuminant from a characterization database using sub-sampled input image data. To state it another way, in some implementations, a respective probability of presence may be calculated for each of a plurality of the LSC tables, and the set of candidate LSC tables to be used going forward may comprise each LSC table among the plurality for which the probability of presence is greater than zero. In various such implementations, each chosen LSC table may correspond to a different respective illuminant, and the probability of presence for each LSC table may indicate a probability of presence of the illuminant to which that LSC table corresponds. It will be understood that many different variations or alternatives for the candidate LSC correction tables are contemplated.

By one alternative, separately from the selection of the candidate correction tables, blocks of the image data may be included in one or more clusters that represent smooth, uniform areas of the image, and are to be used in calculations going forward to generate a composite LSC correction table to be applied to the pre-processed images as well as run-time correction factors before the data is used for display or sent to an encoder for example. Thus, process 800 optionally may include an operation of "match blocks to form clusters" 812. The output from this block matching may include data such as the cluster sizes as well as the location of the pixels, or statistics grid coordinates, in each of the clusters. This cluster data then may be used to determine the reference point on the statistics grid, the statistics grid points to be used to compute the correction factors, and weights to apply to the LSC tables and to determine proportions of the correction factors to be applied to the LSC tables as described below. The details to form the clusters is as follows. Further details may be provided by U.S. patent application Ser. No. 14/498,271, incorporated herein as a reference in its entirety.

The clusters may be formed by a dynamic search in a frame or frame video sequence to form at least one cluster of blocks for a frame. The cluster of blocks represents a smooth uniform area of the image, and may be a select number of pixel locations or points in a statistics grid (such as 3×3 for one non-limiting example). A smooth uniform area refers to an area of the image with the smallest amount of edges, or in other words, without large jumps in luminance or color ratios. The blocks or areas that form the cluster are not necessarily connected, and may be included in the cluster regardless of where the block is located on the image. Thus, the blocks in the cluster are not necessarily in contact with each other, may be scattered through-out the image, and the cluster need not have any certain shape.

Blocks are selected for the cluster (also referred to herein as self-similarity block matching) when blocks have the same property such that the data of the blocks pass one or more criteria related to the image data. By one form, a reference area or block in the image (or more accurately in a statistics grid of image data) is compared to multiple blocks in the image. The statistics grid may be a grid of luminance values or color values or color ratios that are spaced on the grid to correspond to the position of blocks defined on the image. When the comparison satisfies similarity criterion, the two blocks are said to be of the same object, or of the same properties, and the found block is included in the cluster.

Now in more detail, at least partially pre-processed image data is provided to the block selection unit 626 for example, where:

$$X = \{x = (x_1, x_2) : x_1 = 1, \ldots, N, x_2 = 1, \ldots, M\} \quad (a)$$

is the set of coordinates where a statistics grid is defined, and where each point on the statistics grid corresponds to one or more pixels of a downscaled image or frame of a video sequence being analyzed. Here, $x_1$ is the horizontal coordinate, while $x_2$ is the vertical coordinate on an image or grid of size (N, M). The statistics may be Bayer filter data, and comprises at least four-scaled Bayer color channels or elements $\{y_R, y_{Gr}, Y_{Gb}, y_B\}$ associated with each point on the statistics grid. By one example, color ratios are formed by using the Bayer color elements, and at each statistics grid point, to be used for both the block matching and the correction factor computations. Alternatively, a luminance channel y(x) may be used for block matching analysis instead. If the sensor on the image capture device being used comprises other than Bayer layout or color filters, then correction grids may be adjusted accordingly to obtain color ratios, and the process herein still may apply.

By example, one group of pixels spaced away and separate from another group of pixels may have data placed together (union operation) in a single cluster. Each statistics grid for each frame may be divided into blocks. Each smooth area or data cluster (or just cluster) of pixels with similar properties found in the image and that is to be treated as a single cluster is called a region of interest (ROI) Xs or ROI $X_s$. The image, however, may have more than one ROI $X_s$. Thus, s=1 to S where S is the count of the number of clusters or the total number of ROIs within an image.

Also, in order to reduce computational expense, selection of blocks to place in clusters may use block matching from frame to frame. Specifically, motion vectors (MVs or Δx) may be used to improve at least the initial approximation of the location of a region of interest (ROI) for a new frame k+1 such that instead of performing a new search for clusters, a search is performed to see if a cluster from a previous frame still exists on a current frame. In most cases, the previous image is used to obtain the clusters through motion vectors since the previous image should be part of the same scene as the current image and within a video sequence being analyzed. In that case, the location of ROIs Xs are updated from a previous frame according to motion, and specifically, according to motion vectors of blocks or new motion coordinates of blocks obtained by applying the motion vectors. Once the clusters or ROI Xs carried from the previous image are located on the new image, those ROI may be maintained on an index or list of ROI for the current image. Also, ROI Xs that do not meet certain criteria, such as a minimum size in terms of the number of blocks or pixels in the cluster, may be dropped. By one example, a reference point $x_{ref}$ and clusters Xs found by using the motion vectors (and/or all Xs defined for the image) may be considered as preliminary or initial locations. Thus, by one example, block matching calculations such as those described below are still carried out for the Xs for the current image established with motion data to make a more sure determination that the clusters or ROI are valid.

A search then may be performed to establish new clusters. By one approach, both the new reference block and the candidate blocks are in areas of the image not already in a cluster or ROI. Thus, a search is performed to find the reference block in raster fashion, and for a reference block that is not already within another cluster. Once found, a search is performed to find blocks that are not in any other cluster. These blocks are then compared to the new reference block to determine whether the blocks can be part of the new cluster. This process is repeated until all possible clusters in a frame are established.

To match blocks to a reference block to form a cluster, the similarity between the blocks, and in turn the inclusion of the block in a cluster, is established when all of the following conditions are satisfied. By one option, the block matching, and in turn statistics grid, may be based on color values, and particularly color ratios. Specifically, conditions for block similarity are as follows in Eqs. (1) to (3):

$$\begin{cases} x_{ref} \in X - \bigcup_{i=1}^{s-1} X_i, & (1) \\ d(Y_{RG}(B(x_{ref})), Y_{RG}(B(x))) \leq \tau, & (2) \\ d(Y_{BG}(B(x_{ref})), Y_{BG}(B(x))) \leq \tau, & (3) \end{cases}$$

where $x \neq x_{ref}$ and where equation (1) is that at least the reference point, and by one approach the entire reference block anchored at that point, cannot already be located in a previously established cluster or ROI Xs. Equations (2) and (3) are the Euclidean distances using color ratios from the statistics grid or image data, such as:

$$Y_{RG}(B(\cdot)) = \left\{ \frac{y_R(x)}{y_G(x)} : x \in B(\cdot) \right\}, \text{ and} \quad (4)$$

$$Y_{BG}(B(\cdot)) = \left\{ \frac{y_B(x)}{y_G(x)} : x \in B(\cdot) \right\} \quad (5)$$

where the ratio $Y_{RG}$ denotes red $y_R$ over green $y_G$, and ratio $Y_{BG}$ is blue $y_B$ over green $y_G$ color ratios of input statistics, respectively. The Euclidean distance d may be computed as:

$$l_p \text{ metric } d_p(\alpha, \beta) = \left( \sum_{i=1}^{n} |\alpha_i - \beta_i|^p \right)^{1/p} \quad (6)$$

while using $l_2$ (i.e. metric p=2 and is generic unless thresholds are adjusted for that specific metric), and where n is the count of elements in a block and here α may be an element in the block at the reference point $B(x_{ref})$ and β an element in the candidate block B(x) being analyzed for inclusion in the current cluster. If the distance is smaller than the threshold, then the candidate still may be included, and the next equation is checked. The threshold is set during system simulation and testing to achieve best performance. It may be larger than 0 and lower than max value of y(x), or y'(x) respectively, normalized with respect to block B(x) size. Say for threshold τ, it is assumed that a difference equal to 10 between pixels is minor, and two blocks of data containing those pixels are 'similar'. Than a sum of squares of K elements of each pixels of value 10 is sqrt(sum(all K value of 10^2))=sqrt(K*10^2) =10*sqrt(K) which is the threshold. The threshold is adjusted empirically until the best system performance is achieved. Alternatively, the criteria for membership in a cluster may be determined by luminance values rather than color ratios, and may use a derivative function to determine whether criteria has been met, or combination of them. Thus, the criteria may be extended or changed to improve performance or robustness of the method. For example, block-matching comparison in luminance may be used when estimation results may be more reliable than using color ratios.

For the best performance of self-similarity criteria, color ratios $$\frac{y_R}{y_G}, \frac{y_B}{y_G},$$

may be calculated from pre-processed statistics, which by one example may be ISP statistics. Thus, the option exists to use the previous frame correction grid since illumination conditions should not usually change that quickly from single frame to single frame. It should be noted that while pre-processed image data with LSC correction may be used to calculate block similarities, the LSC correction tables (or correction grids) should be applied to raw image data only with black-level correction in order to perform the shading correction on the image data. Also, it will be appreciated that other color spaces may be used such that u and v components can be used after YUV transformation, or a and b components can be used after Lab transformation. The output from the block matching operation includes:

clusters of data $Y_s = \{(y_R(x), y_{G1}(x), y_{G2}(x), y_B(x)) : x \in X_s, s=1, \ldots, S\}$ (7)

or in other words, the output includes identification of the cluster (or ROI Xs), the location of the blocks in each cluster, and the luminance, and/or the Bayer color values at the blocks within the cluster. It will be understood that with the identification of the block, the values related to that block may be looked-up in other locations on a memory, or the values may be collected onto a correction grid for fast retrieval during the LSC correction process.

Process 800 then may include "determine composite LSC tables" 813. The cluster of blocks is then used to find errors in hue and saturation for example, which in turn are used to find weights for the LSC tables. Selected ones of the weighted LSC tables are then provided to correct pre-processed images both directly as a multiplier when forming a composite LSC table (or correction grid) for a specific image, and to provide weights to be used when applying the computed correction factors to the permanent LSC tables (or stored correction grids). Many of the details for determining weights is provided by U.S. patent application Ser. No. 14/182,284 which is incorporated by reference herein for all purposes.

This operation then may include applying selected candidate LSC tables (Light 1, . . . , Light L) with one table for each illuminant detected as possibly present for an image. Also, the candidate tables are applied to non-LSC corrected (or black-level corrected) image data. Then, grey-world (GW-WB) algorithms are applied to at least the image data within the defined clusters and with the initial LSC correction tables applied. This RGB data then may be converted to HSV color space, which generates hue and saturation values for each of the points in the blocks in the clusters.

Next, an error may be calculated for a cluster and per illuminant. Specifically, a respective set of error values may be determined for each of the selected LSC tables in the set of LSC tables. In some implementations, each set of error values may describe error associated with application of its corresponding LSC table to the black-level corrected sensor image. An error $e_{l,s}$ may be calculated for each illuminant l in a cluster-wise manner for each cluster s that is a result of the block matching (or segmentation). The errors $e_{l,s}$ are calculated with respect to origin of coordinates (0 hue and 0 saturation) using equation (8) as follows:

$$e_{l,s} = 1/A_s \sqrt{\sum_i h_i^2 s_i^2}. \quad (8)$$

where here h is hue, s is saturation, $A_s$ is cluster size (as in the area of the cluster) measured by the number of pixels within the cluster or in other words #Xs. Value coordinates are ignored.

A confidence value $c_{l,s}$ (see equations 10 and 11) may be generated for each cluster s and for each illuminant l. Specifically, a larger weight is given to an illuminant having a distribution concentrated around 0, therefore giving a smaller error with respect to origin, based on the following probability equation:

$$P_{l,s} = \begin{cases} 1, & e_{l,s} \leq e_{min}, \\ \frac{e_{max} - e_l}{e_{max} - e_{min}}, & e_{min} < e_l < e_{max}, \\ 0, & \text{otherwise} \end{cases} \quad (9)$$

where $e_{min} = \min_l \{e_{l,s}\}$, $e_{max} = e_{l,s}$*tolerance, s is the cluster index, and tolerance is a relative constant representing how much error can be tolerated (e.g., a tolerance of 5% equals 1.05), or similar function not necessarily piece-wise linear, if computational resources allow. For example, in various implementations in which an image is divided into four rows and six columns of sub-clusters, a set CC of reliability parameters CC(x) may be used that takes the matrix form:

$$CC = \{\hat{c}_{i,j}^{-1}\} = \begin{bmatrix} 256 & 4 & 2 & 2 & 4 & 256 \\ 16 & 2 & 1 & 1 & 2 & 16 \\ 16 & 2 & 1 & 1 & 2 & 16 \\ 256 & 4 & 2 & 2 & 4 & 256 \end{bmatrix} \quad (10)$$

where confidence $c_{l,s}$ in color deviation estimate $e_{l,s}$ in each $X_s$ is an important parameter that depends on spatial location confidence coefficient $\hat{c}_{i,j}$ in each point $x \in X_s$. The confidence coefficient $\hat{c}_{i,j}^{-1}$ represents the reciprocal of the coefficient to be used for the sub-cluster positioned in the $i^{th}$ row and $j^{th}$ column. In various implementations, the coefficients $C_{l,s}$ in equation (10) may be weighted using $c_{i,j}^{-1}$. In some implementations, the approximations used in such a set of reliability parameters may be empirically-based. For example, in various implementations, such approximations may be based on simulation results and/or tests performed on actual image sensor data. The implementations are not limited in this context. In some implementations, interpolation may be used for some points x in order to avoid abrupt changes in weighting when image framing is only slightly changed. It is to be understood that in various implementations, CC (cluster confidence) may differ from the example in Equation (10), depending on the applicable attenuation factors and/or noise model. In some implementations, cluster sizes and shapes that are subject to segmentation may vary, but reliability parameters CC(x), similar to that illustrated in Equation (10), may be fixed and stored for a wide ranges of sensors and/or modules. The implementations are not limited in this context.

Thus, the matrix CC(x) is a deviation of distribution of hue and saturation calculated as sample quadratic error $e_{l,s}$ with respect to origin within $X_s$ for each candidate correction grid $T_l(x)$. A larger amount of data points in $X_s$ results in a higher confidence $c_{l,s}$:

$$c_{l,s} = \frac{1}{NM} \# X_s p_{l,s} \sum_{x \in X_s} cc(x), \quad (11)$$

where cc(x) is interpolated from $\hat{c}_{i,j}$ value in Eq. (31) at point $x \in X$, and $p_{l,s}$ is a function of $T_l(x)$ as in equations (12) to (14) below and within $X_s$.

Thereafter, weights are generated for the LSC tables, and particularly to determine a weight (w1 to wL from equations (12) to (14) below) for individual selected candidate correction tables based on the weights and the confidence values. A respective weight may be determined for each of the set of LSC tables based on the corresponding set of error values for that LSC table. For example, a respective weight may be determined for each of a set of LSC tables based on corresponding sets of error values for each of those LSC tables. In some implementations, a respective set of cluster weights may be calculated for each LSC table in the set, based on a corresponding set of cluster error values for that LSC table, and each cluster weight may correspond to one of the multiple clusters. In various implementations, the respective weight for each LSC table in the set may then be determined as a weighted sum of the cluster weights for that LSC table. In some such implementations, a set of reliability parameters may be identified for each of the multiple clusters, and the weighted sum of the set of cluster weights for each LSC table may be calculated by weighting the cluster weights according to the reliability parameters for their corresponding clusters. In various implementations, the reliability parameters may indicate levels of reliability for error values of their corresponding clusters. The implementations are not limited in this context.

Thus, individual table weights $w_l$ may be generated taking into account confidence $c_{l,s}$ parameters of all clusters or ROIs $X_s$, and color distortion estimates $e_{l,s}$ (for each candidate correction table $T_l$) may be calculated as follows:

$$\overline{w}_l = \sum_{s=1}^{S} c_{l,s} e_{l,s}^{-1} \quad (12)$$

$$w_l = \frac{\overline{w}_l}{\sum_{i=1}^{L} \overline{w}_i}, \quad (13)$$

Once the weight for each table $w_l$ is generated for each LSC table, the composite LSC table may be generated. The composite LSC table may be generated for the pre-processed image based on the respective weights for the set of LSC tables. In some implementations, the composite LSC table may be generated as a weighted sum of the set of LSC tables, based on the respective weights.

Final correction table T(x) is a weighted sum of candidate correction tables $T_l(x)$:

$$T(x) = \sum_{l=1}^{L} T_l(x) w_l, \; x \in X \quad (14)$$

where $X=\{x=(x_1,x_2):x_1=1,\ldots,N, x_2=1,\ldots,M\}$ is the set of coordinates where statistics grid is defined, and $T_l$, $l=1,\ldots,L$ are the predefined generic shading correction grids provided in the camera module configuration file. For the sake of simplicity, shading correction grid $T_l(x)=\{T_l^{Gr}(x), T_l^{R}(x), T_l^{B}(x), T_l^{Gb}(x)\}$, $x \in X$, as a combination of four correction grids for each Bayer color channel. It will be appreciated that there are other ways to calculate the weights for individual illuminant-based LSC tables, and the self-calibration process is not necessarily limited to the described example.

Process 800 then may continue with "apply composite LSC table to image data" 814. Particularly, the composite LSC table is provided to the pre-processing unit 607 to form LSC corrected image data then may be provided to the LSC units herein and for use through encoder 642 and via post-processing unit 640. By one option, the correction factors may be applied to the composite LSC tables before the composite LSC tables are provided to correct the currently running image data. Otherwise, the correction factors are applied to the candidate LSC tables instead as explained below.

Process 800 also continues with "determine LSC correction factors" 816. A process 900 provides the details for determining the LSC correction factors as follows.

Figure 9:
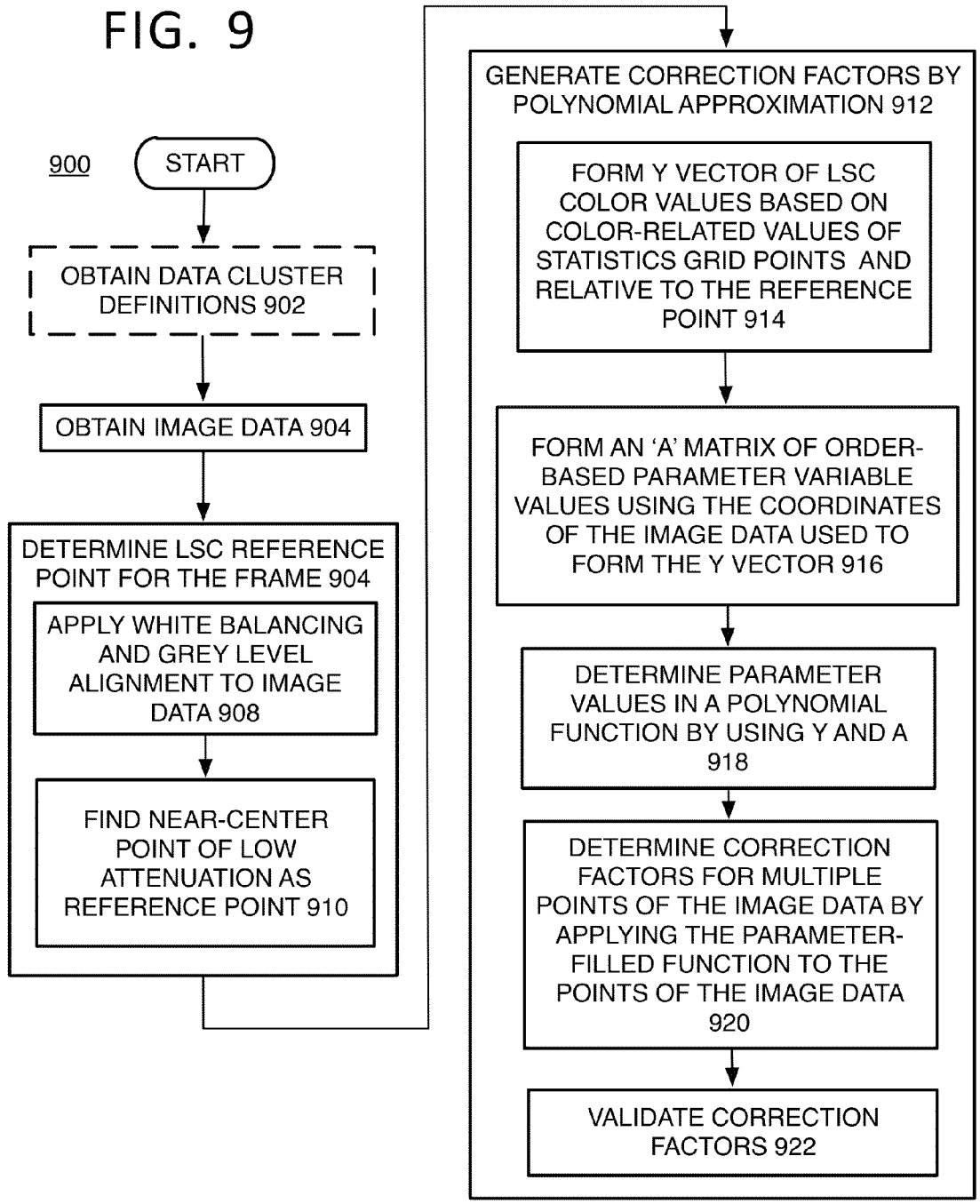
FIG. 9 is another flow chart of a detailed lens shading correction process.

Referring to FIG. 9, details of the run-time self-calibrating lens shading correction process 900 is described herein, and is arranged in accordance with at least some implementations of the present disclosure. In the illustrated implementation, process 900 may include one or more operations, functions or actions as illustrated by one or more of operations 902 to 922 numbered evenly. By way of non-limiting example, process 900 will be described herein with reference to example image capture devices 600 and 1300 of FIGS. 6 and 13 respectively where relevant.

Process 900 may include "obtain data cluster definitions" 902 when clusters are provided, and "obtain image data" 904. Thus, by the example approach, once the weights $w_l$ and lens shading corrected statistics y(x) using T(x) are determined, these features may be the inputs from the lens shading estimation unit 618 to the self-calibrating system or self-correcting unit 628. The statistics comprises the four downscaled Bayer color channels $\{y_{Gr}, y_R, y_B, y_{Gb}\}$. Also, when the correction factors are to be based on the image data from clusters, the segmentation/cluster unit may provide the coordinates locations of the clusters on the image being analyzed. The system then uses the statistics from the points within the clusters as described below.

The process 900 then includes "determine LSC reference point for the frame" 906. For this operation, the process 900 includes "apply white balancing and grey level alignment to image data" 908. Thus, image data is white-balanced, and by one example, corrected statistics y(x) is white-balanced using grey-world white balance (GW-WB) in each cluster $X_s$ where levels of grey are aligned to a single level in all ROIs. In other words, once the white balancing is performed for a cluster, a single grey level is set for the image data within that cluster. The grey level may be a mean, max, min grey level, or point closest to the sensor center within the cluster for example. Other examples may include using a combination of closest center points such as a mean of the closest 3 to 5 points, and so forth. Each cluster may have a different grey level. This is performed by the local white balancer and grey-level aligner unit 630 and separately from the white balancing performed to generate the LSC table weights by the lens shading estimation unit 618.

Determining the LSC reference point may then include "find near-center point of low attenuation as reference point" 910. Once the white balancing and grey level alignment is complete, a search may be performed, and in the clusters when present, to find a single reference point assumed to have the lowest attenuation. By one example, the clusters are assumed to have the points with the lowest attenuation, and the point in a union of all of the points in the clusters in an image and that is the closest point to the optical or geometric center of the image is selected as the reference point. Another way to state this is to recite that the reference point $x_{ref}$ (not to be confused with the reference point $x_{ref}$ used to form each cluster) can be chosen to be unique for all identified clusters $X_s$, $x_{ref} \in U_s X_s$, as the one closest to geometrical center of the statistics grid (N/2, M/2) where the statistics grid is defined to have a size of width N and height M. This may be one of the operations performed by the polynomial approximation unit 634.

It will be understood that many other options exist, such as calculating a lowest attenuation point in the clusters as the reference point, or finding a sub-set of points with the same or similar low attenuation, and then setting the point closest to the center of the grid and within that subset as the reference point. By one approach, any other point from a cluster may be used as the reference point that is found to be convenient, efficient, or so forth. The closest point to the center is assumed to be the most reliable.

Process 900 may include "generate correction factors by polynomial approximation" 912. One assumption exploited in this process is that color ratios can be largely represented in parametric form as in Eq. (15). For the sake of simplicity, a polynomial model of 2nd order may be used in the following form (where P=6 parameters):

$$\frac{(y_R(x)/y_G(x))_{obs}}{(y_R(x)/y_G(x))_{ref}} \cong \hat{b}_1 + \hat{b}_2 x_1 + \hat{b}_3 x_2 + \hat{b}_4 x_1 x_2 + \hat{b}_5 x_1^2 + \hat{b}_6 x_2^2 = f(x), \quad (15)$$
$$x \in X,$$

for the red channel, where $Y_G(x)=(y_{Gr}(x)+Y_{Gb}(x))/2$, and $(y_R(x)/y_G(x))_{obs}$ is the color ratio at a point in the statistics grid or observation data, and by one example, from the points in the clusters. Also, $(Y_R(x)/y_G(x))_{ref}$ is the color ratio for the reference point (or a combination of ratios, such as a mean, from multiple reference points from one or more reference frames). This fraction of color-related observation/reference values, and specifically of color ratios, is referred to herein as the LSC color value. Ideally, reference data $(y_R(x)/y_G(x))_{ref}$ is a perfectly corrected observation itself, which may not be available in practice. Hence, using the LSC color value with the points from data clustering as described herein provides at least a model that is closer to ideal rather than using an entire generic image. As mentioned above, and as used here for computation of correction factors, a frame may be segmented into flat homogeneous clusters defined as regions of interest (ROI) $X_s$, s=1, ..., S where S is the total number of clusters on an image or frame. Here, for the sake of simplicity, we denote reference data $(y \cdot (x))_{ref}$ as data $y \cdot (x_{ref})$ at the reference point $x_{ref}$, which is similar to notation of the observations. Alternatively, such reference image could be an image from a previous iteration.

It will be appreciated that the order of the approximating model may vary and hence value of P also may change.

Figure 10A:
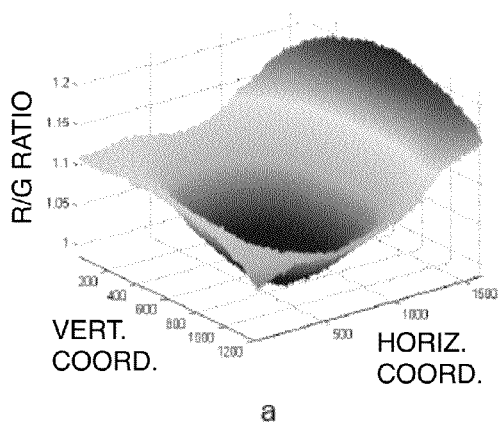
FIG. 10A is a graph to show an example of a red/green color ratio relative to reference data for an example image and provided for fluorescent light.
Figure 10B:
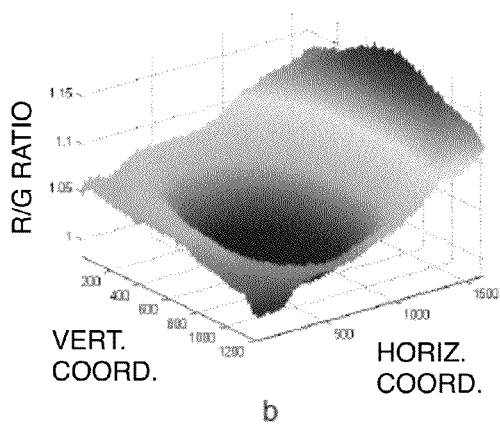
FIG. 10B is a graph to show an example spectra for a red/green color ratio relative to reference data for an example image and provided for day light.

While equation (15) recites the red channel color ratios, the blue channel is calculated analogously by replacing $y_R$ by $y_B$. Example of such data using a red color channel is shown in FIGS. 10A-10B for two different light sources (fluorescent light and day light respectively). The vertical axis of each graph is the color ratio, and the base of the graphs show the horizontal and vertical coordinates of the pixel locations (or statistics grid locations) of the image.

Process 900 includes "form Y vector of LSC color values based on color-related values of the statistic grid points and relative to the reference point" 914, and where the color-related values may be color ratios, and by one example using the Bayer filter color channels. In order to calculate the LSC color values, the color ratio generator unit 632 may collect or compute the color ratios for each of the points in the clusters (or other area used). The LSC color values may be calculated using the fraction in equation (15) above left side of the equation) and by the color ratio generator unit 632. The LSC color values are then placed in, or considered to be in, a vector Y.

Process 900 also includes "form an 'A' matrix of order-based parameter variable values using the coordinates of the image data used to form the Y vector" 916. This may be performed by the global polynomial approximation unit 634. In detail, parameterization is carried out at observation data points $x \in U_s X_s$. Parametric approximation Eq. (15) is performed by using the solution of an ill-posed linear system with matrix multiplication with vector Y=Ab as:

$$\hat{b} = \operatorname{argmin}_b \{\|Y - Ab\| + r^2 \|b\|\} \quad (16)$$

where Y is the vector of LSC color values described above and referred to here as K=#$U_s X_s$ input data $$\frac{(y_R(x)/y_G(x))_{obs}}{(y_R(x)/y_G(x))_{ref}}, x \in U_S X_S,$$

$x \in U_s X_s$, b is the vector of P parameters ($b_1$ to $b_P$) of the approximation function, $r^2$ is a regularization parameter, and symbol # denotes number of elements in a set (or cluster). The regularization parameter $r^2$ is determined by system requirements and limitations, and by existence of inverse matrix $(A^T A)^{-1}$ of $A^T A$. If inverse matrix exists then $r^2$ can be set to zero. If inverse matrix does not exist, or solution is unstable, than $r^2$ can be set to a small constant value larger than zero (e.g. 0.001 or 0.01), or selected dynamically using cross-validation, l-curve, or other methods for selection regularization parameters in ill-posed problems. A is a matrix of K observations Y at P variables. In other words, matrix A is established as follows:

| grid point | $b_1$ var. | $b_2$ var. | $b_3$ var. | $b_4$ var. | $b_5$ var. | $b_6$ var. |
|---|---|---|---|---|---|---|
| $x_1, x_2$ | 1 | $x_1$ | $x_2$ | $x_1 x_2$ | $x_1^2$ | $x_2^2$ |
| $x_{1a}, x_{2a}$ | 1 | $x_{1a}$ | $x_{2a}$ | $x_{1a} x_{2a}$ | $x_{1a}^2$ | $x_{2a}^2$ |
| ⋮ | ⋮ | ⋮ | ⋮ | ⋮ | ⋮ | ⋮ | where the "grid points" column is each different point with an LSC color value in vector Y, and may be all of the cluster points or other grouping of smooth area points of the image. Each of the other columns is a variable by order and position in the function and corresponding to the parameter that it is to be multiplied by in the function. The subscript a ($_{1a}$ or $_{2a}$) simply refers to the values for the next grid point in the $2^{nd}$ row being different than those in the first row, and so forth for each row. Inverting the matrix multiplication equation, a solution then can be found in the following form:

$$\hat{b} = (A^T A + r^2 \operatorname{diag}(P))^{-1} A^T Y, \quad (17)$$

where Y and A are as defined above and diag(P) is a diagonal square matrix of size P×P with values one on a main diagonal and other values are zeros, and where from eq. (15), it follows that P=6, i.e. b=($b_1$, ..., $b_P$), and $\hat{b}$ is an estimate vector of b such that color ratio distortion function $f(\bullet)$ for all $x_1$ and $x_2$ is as:

$$f(x_1, x_2) = \hat{b}_1 + \hat{b}_2 x_1 + \hat{b}_3 x_2 + \hat{b}_4 x_1 x_2 + \hat{b}_5 x_1^2 + \hat{b}_6 x_2^2, \quad (18)$$

$$x = (x_1, x_2) \in X,$$

With equation (18) then, process 900 continues with "determine parameter values in polynomial function by using Y and A" 918. Thus, the parameter values $\hat{b}_1$ to $\hat{b}_6$ are solved by using equation (17).

Once the parameter values are determined, the process 900 may continue with "determine correction factors for multiple points of the image data by applying the parameter-filled function to the points of the image data" 920. Thus, the parameter values are inserted into equation 18. The coordinates of each point being analyzed (the points having an LSC color value in vector Y) then may be inserted into the appropriate $x_1$ or $x_2$ variable locations to solve for the function solution f(x). By one form, the function includes parameters $\hat{b}_1$ to $\hat{b}_6$, and wherein 1, $x_1$, $x_2$, $x_1 x_2$, $x_1^2$, and $x_2^2$ are variable order and positions that are respectively multiplied by the parameters to form products, and where the products are summed in any order.

Correction factor c(x) is calculated by inverting against a point at the optical axis, which is extrema of the parabolic function, depending on orientation:

$$c(x) = \begin{cases} \dfrac{\max\{f(x)\}}{f(x)}, & \text{if } \alpha_2 < 0 \text{ and } \beta_2 < 0, \\ \dfrac{\min\{f(x)\}}{f(x)}, & \text{if } \alpha_2 > 0 \text{ and } \beta_2 > 0 \end{cases} \quad (19)$$

where $a_2$ refers to the first parameter in the function, and $\beta_2$ refers to the second parameter in the function of equation (15) or (18). Process 900 includes "validate correction factors" 922, and particularly refers to calculating the c(x) differently depending on the signs of the parameters. Specifically, if both $\alpha_2$ and $\beta_2$ parameters are negative, the correction factor is near a maximum extrema, but when both parameters $\alpha_2$ and $\beta_2$ are positive, the correction factor is near a minimum extrema. When the $\alpha_2$ and $\beta_2$ parameters have positive and negative signs, the correction factor is invalid and omitted when correction factors are applied to the LSC tables.

Returning again to FIG. 8, once the correction factors are computed, process 800 includes "adjust candidate LSC tables" 820 which includes applying the correction factors for specific points to the values in the LSC candidate tables for corresponding points. The correction factors may be applied to only the points in the clusters, or function (18) may be used with all points on the image (or statistics grid) to adjust all points on the image. The correction c(x) is distributed among characterized light sources provided by camera configuration proportionally to weights $w_l$ obtained from light source estimation—which as discussed may or may not be based on clusters. The correction factors are applied to red and blue color channels, and calculated, respectively to Eq. (16)-Eq. (19) by replacing $y_R$ by $y_B$ in Eq. (15), while maintaining the green channels unmodified.

By one alternative, and for a first or initialization frame for example, the correction factors may be applied to the composite LSC table for a current frame being analyzed when the candidate LSC tables have already been applied and used to form weights for the LSC tables.

Figure 11A:
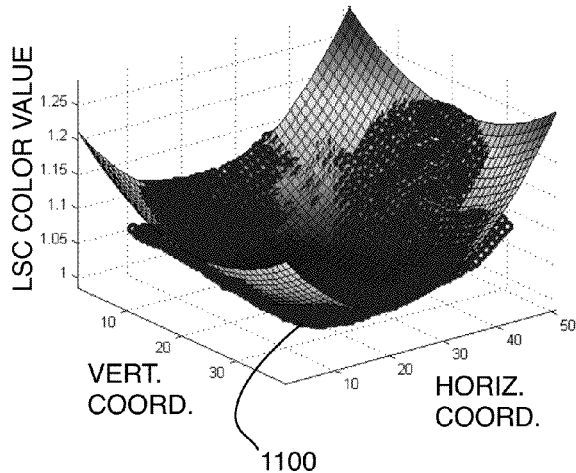
FIG. 11A is a graph to show parameterization of relative red/green color ratios from FIG. 10A with observation points and an approximation function for red/green color ratios.
Figure 11B:
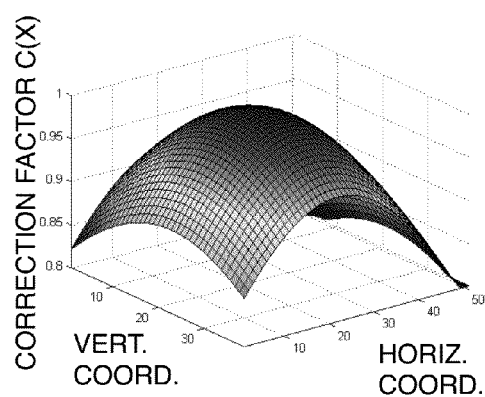
FIG. 11B is a graph of correction factors for a red color channel shading correction grid.

Referring to FIGS. 11A-11B, calculation flow of Eq. (17)-Eq. (18) is illustrated. Blue points at FIG. 11A are the LSC color values $$\frac{(y_R(x)/y_G(x))_{obs}}{(y_R(x)/y_G(x))_{ref}}$$

as in Eq. (15) for a flat target image, and $X_1$ is the set of coordinates where this data is defined. Corners of the image are not included in $X_1$ when calculating Eq. (16)-Eq. (17) to improve accuracy of the parametric fit. The function $f(\bullet)$ of Eq. (18) is the solid surface 1100 in FIG. 11A, and correction c(x) of Eq. (19) is shown in FIG. 11B.

Process 800 also includes "storing LSC correction factors" 818. Correction factors c(x) for both red and blue color channels are stored to a file system and may be reused to apply to the candidate LSC tables upon following camera initializations or other desired practical, time points.

It will be appreciated that the correction factor generation described herein may apply to other LSC systems that do not determine weights per illuminant LSC table and/or do not use smooth area clusters to determine the weights, and/or calculate the correction factor reference point, and/or provide the points for computing the correction factor. Thus, by one alternative example, the LSC system herein may simply use all points in an image (or otherwise a designated smooth areas of the image, or an image that may be found during run-time to be, or assumed to be, a close-to-flat field image), and the weights may be provided by alternative known methods rather than the clusters described herein. For example, it may be possible to use the previous corrected frame in the video stream as reference data utilizing all data points and without any clustering involved.

Referring to FIG. 12, process 1200 illustrates the operation of a sample image processing system 1300 that performs lens shading correction in accordance with at least some implementations of the present disclosure. In more detail, in the illustrated form, process 1200 may include one or more operations, functions or actions as illustrated by one or more of actions 1202 to 1216 numbered evenly. By way of non-limiting example, process 1200 will be described herein with reference to FIG. 13. Specifically, system 1300 includes logic units 1304 that has a 3A component 1310 that may have a lens shading correction (LSC) factory calibration unit 1311 and a self-correcting unit 1314. The operation of the system may proceed as follows.

Process 1200 may include "receive generic golden-device correction grids as LSC tables" 1202, and as explained above, a device with ideal features may be used to capture a flat field image with a light-controlled environment for a number of different illuminants. The data then may be used to provide generic correction grids (or candidate LSC tables) to all of the devices on a production-line for example.

Process 1200 may optionally include "generate device-specific corrections by using the device to capture flat field image and apply to LSC tables" 1204. Here, a production-line flat field image captured with each device may be used to provide device-specific correction factors. These correction factors are then stored on the device to modify the pre-stored generic correction grids upon initialization of the device. As mentioned, such a production-line calibration is no longer critical and may even be eliminated with the self-calibrating operations described herein.

Process 1200 may include "store LSC tables" 1206. The generic correction grids, with or without modification by production-line device-specific correction, may be stored on the device, and at one of the memories described herein for example. The stored correction grids are the candidate LSC tables that then may be used by an LSC estimation unit to generate LSC table weights and composite LSC tables to be applied to image data as described herein.

Process 1200 may include "receive image data" 1208. The data may be at least partially pre-processed image data, and it may be in the form of a statistics grid of color values (or color value ratios). The self-correcting unit 628 or 1314 may receive image data that is already LSC corrected in order to perform the block matching mentioned herein, but the lens shading correction estimation unit should still receive non-LSC corrected image data for application of the candidate LSC tables. By one form, this latter image data is raw data that only received black-level correction so far.

Process 1200 may optionally include "receive data cluster definitions" 1210, and particularly, the coordinates of the points of the clusters that define smooth uniform areas of the image. The clusters may be defined as described above where a cluster reference point or block is selected, and other blocks are compared to the reference block to determine whether a criteria is met, such as below a threshold difference in luminance or color-related values such as color ratios. The clusters also may be established by using motion data, such as motion vectors, to at least initially locate cluster reference points or blocks on a current image by using the location of the reference blocks from a previous image in order to reduce the computational load of block matching. Once the clusters are established, a motion estimation unit may use the data from the clusters to calculate weights for each LSC table selected for a different illuminant type found to be present in the current image being analyzed.

Process 1200 may include "determine reference point of image data" 1212. This operation, may include determining a point on the image, or statistics grid, with low or lowest attenuation. When clusters are being used, the point within the clusters and that is closest to an optical or geometric center of the image may be used as the reference point by one example explained above.

Process 1200 may include "generate Y vectors of LSC color values relative to the reference point" 1214. This operation includes calculating an LSC color value for multiple points on the statistic grid, and by one example, all of such points within the clusters. The LSC color values are formed by using color-related values such as color ratios of the Bayer filter color values from the multiple points and the reference point on the statistics grid. The calculation may be performed twice, one for red and one for blue whereas the green values stay the same for both calculations. By one example, the LSC color value is a proportion or fraction of color ratios such as that of the left side of equation (15) recited above.

Process 1200 may include "generate an 'A' matrix of order-based parameter variable values" 1216. This operation includes establishing a function in the form of a polynomial equation, such as that shown in equations (15) and (18), and forming a matrix where each row represents a point used for vector Y, and each column is a parameter variable value from the function and that is to be multiplied by the respective parameter in the equation. An example of a matrix 'A' is provided above.

Process 1200 may include "determine parameter values" 1218. This operation includes using a matrix multiplication by one example where Y=Ab where b is a vector of the parameters from the function at equation (15). Using the Y and A as defined above, and solving for b will establish the parameters for the function.

Process 1200 may include "determine correction factors" 1220. Once the parameter values are established, they are inserted into the function. The function can then be applied to the points in the clusters or all points in the image (or statistics grid). The correction factor c(x) for a point is then either a max $\{f(x)\}/f(x)$ or a min $\{f(x)\}/f(x)$ (equation 19).

Process 1200 may include "validate correction factors" 1222. This operation includes determining whether the first two parameters in the function are positive or negative. When they are both negative, the min. correction factor is used. When the parameters are both positive, the max. correction factor is used. However, when the parameters do not have the same sign, the correction factor is invalid and is not used.

Process 1200 may then include "apply correction factors to LSC tables" 1224. Once the correction factors are established, the correction factors are stored and may be applied to the LSC candidate illuminant tables upon initialization of the device. Otherwise, the correction factors could be applied to the LSC composite tables during run-time.

In addition, any one or more of the operations of FIGS. 1-12 may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more computer or machine-readable media. In general, a machine-readable medium may convey software in the form of program code and/or instructions or instruction sets that may cause any of the devices and/or systems to perform as described herein. The machine or computer readable media may be a non-transitory article or medium, such as a non-transitory computer readable medium, and may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 13:
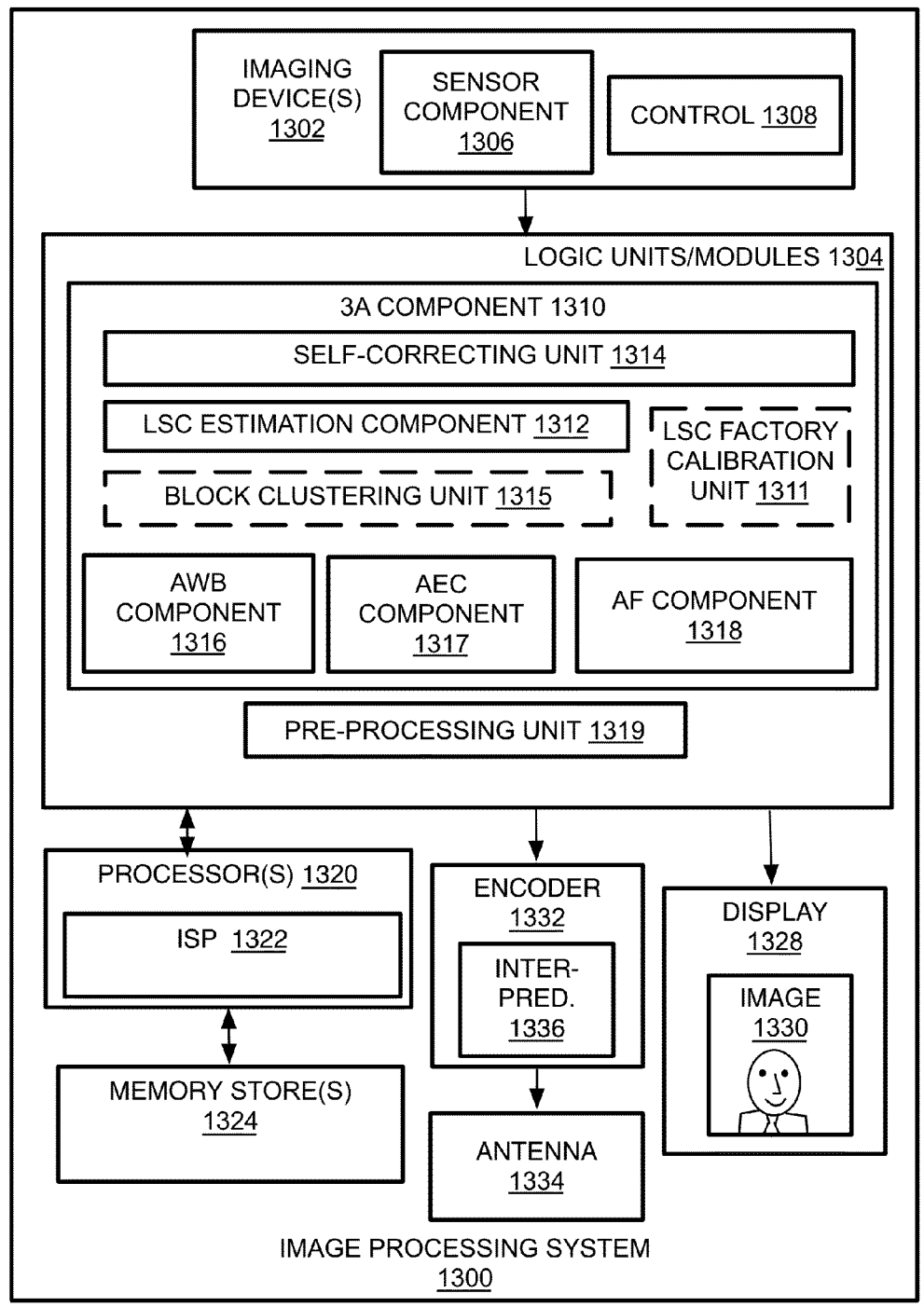
FIG. 13 is an illustrative diagram of an example system.

Referring to FIG. 13, an example image processing system 1300 is arranged in accordance with at least some implementations of the present disclosure. In various implementations, the example image processing system 1300 may have an imaging device 1302 to form or receive captured image data. This can be implemented in various ways. Thus, in one form, the image processing system 1300 may be a digital camera or other image capture device, and imaging device 1302, in this case, may be the camera hardware and camera sensor software, module, or component. In other examples, imaging processing system 1300 may have an imaging device 1302 that includes or may be a camera, and logic modules 1304 may communicate remotely with, or otherwise may be communicatively coupled to, the imaging device 1302 for further processing of the image data.

In either case, such technology may include a camera such as a digital camera system, a dedicated camera device, or an imaging phone, whether a still picture or video camera or some combination of both. Thus, in one form, imaging device 1302 may include camera hardware and optics including one or more sensors as well as auto-focus, zoom, aperture, ND-filter, auto-exposure, flash, and actuator controls. These controls may be part of a sensor module or component 1306 for operating the sensor. The sensor component 1306 may be part of the imaging device 1302, or may be part of the logical modules 1304 or both. Such sensor component can be used to generate images for a viewfinder and take still pictures or video. The imaging device 1302 also may have a lens, an image sensor with a RGB Bayer color filter, an analog amplifier, an A/D converter, other components to convert incident light into a digital signal, the like, and/or combinations thereof. The digital signal also may be referred to as the raw image data herein.

Other forms include a camera sensor-type imaging device or the like (for example, a webcam or webcam sensor or other complementary metal-oxide-semiconductor-type image sensor (CMOS)), without the use of a red-green-blue (RGB) depth camera and/or microphone-array to locate who is speaking. The camera sensor may also support other types of electronic shutters, such as global shutter in addition to, or instead of, rolling shutter, and many other shutter types. In other examples, an RGB-Depth camera and/or microphone-array might be used in addition to or in the alternative to a camera sensor. In some examples, imaging device 1302 may be provided with an eye tracking camera. The imaging device 1302 also may have a lens actuator or control 1308 that has a lens and a lens driver or driver logic that receives commands to move the lens and applies an electrical current to move the lens.

In the illustrated example, the logic modules 1304 may include the 3A component 1310 that, in turn, may include an AF component 1318 to compute a desired new current lens position, an automatic white balance (AWB) component 1316, and an automatic exposure control (AEC) component 1317. The 3A component unit 1310 also may have a lens shading correction (LSC) factory calibration unit 1311, an estimation component 1312, a self-correcting unit 1314 that performs many of the operations described herein, an optional block clustering unit 1315, and a pre-processing unit 1319. The 3A component unit 1310 may be operated by, or even entirely or partially located at, processor(s) 1320, and which may include an ISP 1322 to perform the operations. The logic modules may be communicatively coupled to the components of the imaging device 1302 in order to receive raw image data. In these cases, it is assumed the logic modules 1304 are considered to be separate from the imaging device. This need not be so, and the logic modules very well may be considered to be part of the imaging device as well.

The image processing system 1300 may have one or more processors 1320 which may include a dedicated image signal processor (ISP) 1322 such as the Intel Atom, memory stores 1324 which may or may not hold the LSC tables, correction factors, and other LSC correction data, one or more displays 1328 to provide images 1330, encoder 1332 that has an inter-prediction unit 1336 to provide motion data such as motion vectors for example, and antenna 1334. In one example implementation, the image processing system 1300 may have the display 1328, at least one processor 1320 communicatively coupled to the display, at least one memory 1324 communicatively coupled to the processor to perform the operations described herein as explained above. The encoder 1332 and antenna 1334 may be provided to compress the modified image date for transmission to other devices that may display or store the image as well as provide the motion data for block matching. It will be understood that the image processing system 1300 may also include a decoder (or encoder 1332 may include a decoder) to receive and decode image data for processing by the system 1300. Otherwise, the processed image 1330 may be displayed on display 1328 or stored in memory 1324. As illustrated, any of these components may be capable of communication with one another and/or communication with portions of logic modules 1304 and/or imaging device 1302. Thus, processors 1320 may be communicatively coupled to both the image device 1302 and the logic modules 1304 for operating those components. By one approach, although image processing system 1300, as shown in FIG. 13, may include one particular set of blocks or actions associated with particular components or modules, these blocks or actions may be associated with different components or modules than the particular component or module illustrated here.

Figure 14:
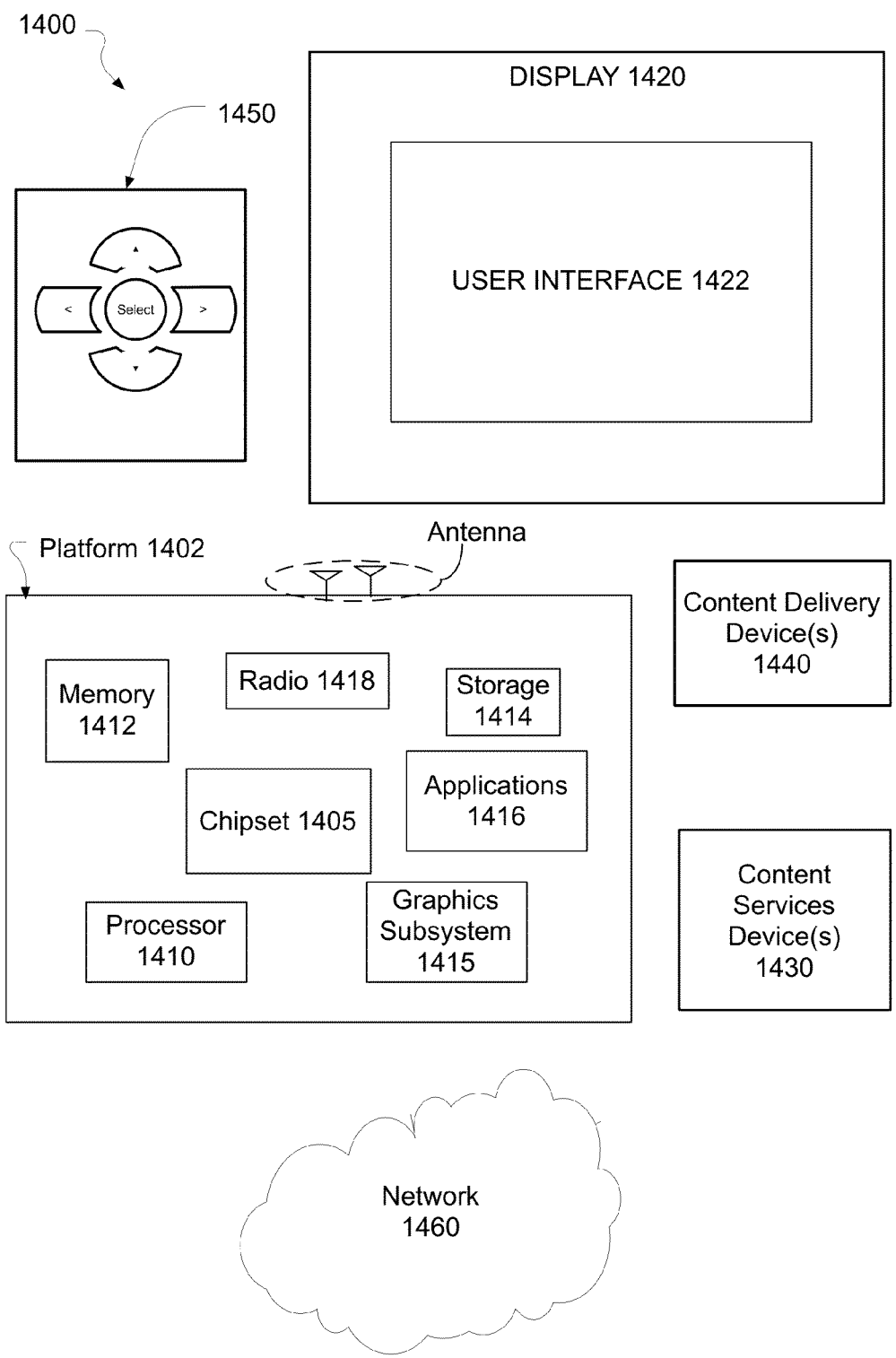
FIG. 14 is an illustrative diagram of another example system.

Referring to FIG. 14, an example system 1400 in accordance with the present disclosure operates one or more aspects of the image processing system described herein. It will be understood from the nature of the system components described below that such components may be associated with, or used to operate, certain part or parts of the image processing system described above. In various implementations, system 1400 may be a media system although system 1400 is not limited to this context. For example, system 1400 may be incorporated into a digital still camera, digital video camera, mobile device with camera or video functions such as an imaging phone, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1400 includes a platform 1402 coupled to a display 1420. Platform 1402 may receive content from a content device such as content services device(s) 1430 or content delivery device(s) 1440 or other similar content sources. A navigation controller 1450 including one or more navigation features may be used to interact with, for example, platform 1402 and/or display 1420. Each of these components is described in greater detail below.

In various implementations, platform 1402 may include any combination of a chipset 1405, processor 1410, memory 1412, storage 1414, graphics subsystem 1415, applications 1416 and/or radio 1418. Chipset 1405 may provide intercommunication among processor 1410, memory 1412, storage 1414, graphics subsystem 1415, applications 1416 and/or radio 1418. For example, chipset 1405 may include a storage adapter (not depicted) capable of providing intercommunication with storage 1414.

Processor 1410 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1410 may be dual-core processor(s), dual-core mobile processor(s), and so forth.

Memory 1412 may be implemented as a volatile memory device such as, but not limited to, a Random Access Memory (RAM), Dynamic Random Access Memory (DRAM), or Static RAM (SRAM).

Storage 1414 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1414 may include technology to increase the storage performance enhanced protection for valuable digital media when multiple hard drives are included, for example.

Graphics subsystem 1415 may perform processing of images such as still or video for display. Graphics subsystem 1415 may be a graphics processing unit (GPU) or a visual processing unit (VPU), for example. An analog or digital interface may be used to communicatively couple graphics subsystem 1415 and display 1420. For example, the interface may be any of a High-Definition Multimedia Interface, Display Port, wireless HDMI, and/or wireless HD compliant techniques. Graphics subsystem 1415 may be integrated into processor 1410 or chipset 1405. In some implementations, graphics subsystem 1415 may be a stand-alone card communicatively coupled to chipset 1405.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further implementations, the functions may be implemented in a consumer electronics device.

Radio 1418 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1418 may operate in accordance with one or more applicable standards in any version.

In various implementations, display 1420 may include any television type monitor or display. Display 1420 may include, for example, a computer display screen, touch screen display, video monitor, television-like device, and/or a television. Display 1420 may be digital and/or analog. In various implementations, display 1420 may be a holographic display. Also, display 1420 may be a transparent surface that may receive a visual projection. Such projections may convey various forms of information, images, and/or objects. For example, such projections may be a visual overlay for a mobile augmented reality (MAR) application. Under the control of one or more software applications 1416, platform 1402 may display user interface 1422 on display 1420.

In various implementations, content services device(s) 1430 may be hosted by any national, international and/or independent service and thus accessible to platform 1402 via the Internet, for example. Content services device(s) 1430 may be coupled to platform 1402 and/or to display 1420. Platform 1402 and/or content services device(s) 1430 may be coupled to a network 1460 to communicate (e.g., send and/or receive) media information to and from network 1460. Content delivery device(s) 1440 also may be coupled to platform 1402 and/or to display 1420.

In various implementations, content services device(s) 1430 may include a cable television box, personal computer, network, telephone, Internet enabled devices or appliance capable of delivering digital information and/or content, and any other similar device capable of unidirectionally or bidirectionally communicating content between content providers and platform 1402 and/display 1420, via network 1460 or directly. It will be appreciated that the content may be communicated unidirectionally and/or bidirectionally to and from any one of the components in system 1400 and a content provider via network 1460. Examples of content may include any media information including, for example, video, music, medical and gaming information, and so forth.

Content services device(s) 1430 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1402 may receive control signals from navigation controller 1450 having one or more navigation features. The navigation features of controller 1450 may be used to interact with user interface 1422, for example. In implementations, navigation controller 1450 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1450 may be replicated on a display (e.g., display 1420) by movements of a pointer, cursor, focus ring, or other visual indicators displayed on the display. For example, under the control of software applications 1416, the navigation features located on navigation controller 1450 may be mapped to virtual navigation features displayed on user interface 1422, for example. In implementations, controller 1450 may not be a separate component but may be integrated into platform 1402 and/or display 1420. The present disclosure, however, is not limited to the elements or in the context shown or described herein.

In various implementations, drivers (not shown) may include technology to enable users to instantly turn on and off platform 1402 like a television with the touch of a button after initial boot-up, when enabled, for example. Program logic may allow platform 1402 to stream content to media adaptors or other content services device(s) 1430 or content delivery device(s) 1440 even when the platform is turned "off." In addition, chipset 1405 may include hardware and/or software support for 8.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1400 may be integrated. For example, platform 1402 and content services device(s) 1430 may be integrated, or platform 1402 and content delivery device(s) 1440 may be integrated, or platform 1402, content services device(s) 1430, and content delivery device(s) 1440 may be integrated, for example. In various implementations, platform 1402 and display 1420 may be an integrated unit. Display 1420 and content service device(s) 1430 may be integrated, or display 1420 and content delivery device(s) 1440 may be integrated, for example. These examples are not meant to limit the present disclosure.

In various implementations, system 1400 may be implemented as a wireless system, a wired system, or a combination of both. When implemented as a wireless system, system 1400 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1402 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 14.

Figure 15:
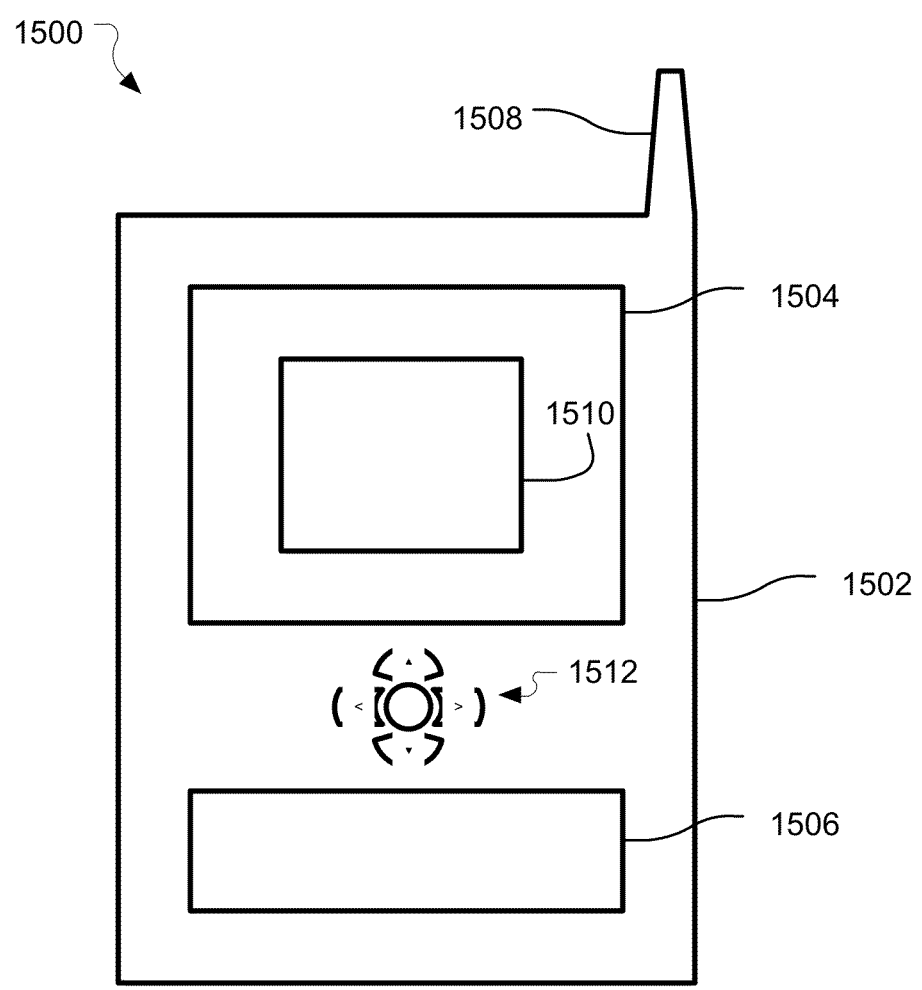
FIG. 15 illustrates another example device, all arranged in accordance with at least some implementations of the present disclosure.

Referring to FIG. 15, a small form factor device 1500 is one example of the varying physical styles or form factors in which system 1400 may be embodied. By this approach, device 1500 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 15, device 1500 may include a housing 1502, a display 1504 including a screen 1510, an input/output (I/O) device 1506, and an antenna 1508. Device 1500 also may include navigation features 1512. Display 1504 may include any suitable display unit for displaying information appropriate for a mobile computing device. I/O device 1506 may include any suitable I/O device for entering information into a mobile computing device. Examples for I/O device 1506 may include an alphanumeric keyboard, a numeric keypad, a touch pad, input keys, buttons, switches, rocker switches, microphones, speakers, voice recognition device and software, and so forth. Information also may be entered into device 1500 by way of microphone (not shown). Such information may be digitized by a voice recognition device (not shown). The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one implementation may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further implementations.

By one example, a computer-implemented method of lens shading correction (LSC), comprises obtaining at least one statistics grid of pixel data spatially corresponding to a frame; determining a reference point on the statistics grid depending on color shading data of the frame; and generating LSC color values of a plurality of points on the statistics grid, wherein each LSC color value is associated with a color-related value from one of the plurality of points and a color-related value at the reference point. The method also comprises generating parameter variable values associated with a function and for each of the plurality of points with an LSC color value; determining parameter values of the function using the parameter variable values and the LSC color values; and computing lens shading correction factors for the plurality of points by using the function with the parameter values inserted into the function.

By another implementation, the method may comprise a wherein the reference point is the point on the statistics grid with the lowest color attenuation; wherein the reference point is selected from locations corresponding to at least one cluster of blocks associated with a smooth and uniform area of the frame, wherein the reference point is the point within the cluster(s) that is the closest to a center of the statistics grid or frame; and wherein the blocks form a cluster by having luminance or color shading values of the block or at least one pixel point in the block that meet a criteria. The method also may include that each LSC color value is associated with a color ratio of a different point on the statistics grid; wherein each LSC color value is computed as a color ratio at a point on the statistics grid divided by a color ratio at least one reference point; wherein the LSC color values are only provided for points corresponding to one or more specified clusters of blocks of smooth and uniform areas of the frame; and wherein the LSC color values are formed into a vector Y, and the parameter variable values are formed into a matrix A both used in an equation to determine a vector of the parameter values. Generating parameter variable values comprises forming a matrix wherein each row or column represents one of the plurality of points with a LSC color value, and wherein the other of the row or column of the matrix represents a variable order and position in the function to be multiplied by a corresponding parameter; wherein the function includes parameters $\hat{b}_1$ to $\hat{b}_6$, and wherein 1, $x_1$, $x_2$, $x_1 x_2$, $x_1^2$, and $x_2^2$ are variable order and positions that are respectively multiplied by the parameters to form products, and wherein the products are summed in any order, and $x_1$, $x_2$ are the horizontal and vertical point coordinates respectively, and on the statistics grid; and wherein computing the lens shading correction factors comprises entering point coordinates into the function with the parameter values filled into the function to compute the correction factor for a point.

The method also may comprise validating the correction factor by determining whether one or more of the parameters have a positive or negative value; and proportionally applying the correction factor to the same corresponding point in multiple lens shading correction tables each associated with a different illuminant and for the same frame, and proportionally depending on weights applied to each lens shading correction table, wherein the weights are formed by using one or more specified clusters of image data that are associated with smooth and uniform areas of the frame.

By yet another implementation, a computer-implemented system has a display, at least one processor communicatively coupled to the display, at least one memory communicatively coupled to at least one processor and storing image capture data of at least one frame of a video sequence or at least one still photograph, and at least one lens shading correction (LSC) unit communicatively coupled to the processor. The at least one lens shading correction unit is provided to obtain at least one statistics grid of pixel data spatially corresponding to a frame; determine a reference point on the statistics grid depending on color shading attenuation of the image data; generate LSC color values of a plurality of points on the statistics grid, wherein each LSC color value is associated with a color-related value from one of the plurality of points and a color-related value at the reference point; generate parameter variable values associated with a function and for each of the plurality of points with an LSC color value; determine parameter values of the function using the parameter variable values and the LSC color values; and compute lens shading correction factors for the plurality of points by using the function with the parameter values inserted into the function.

By another example, the system includes that the reference point is the point on the statistics grid with the lowest color attenuation; wherein the reference point is selected from locations corresponding to at least one cluster of blocks associated with a smooth and uniform area of the frame, wherein the reference point is the point within the cluster(s) that is the closest to a center of the statistics grid or frame; and wherein the blocks form a cluster by having luminance or color shading values of the block or at least one pixel point in the block that meet a criteria. The system also may include that each LSC color value is associated with a color ratio of a different point on the statistics grid; wherein each LSC color value is computed as a color ratio at a point on the statistics grid divided by a color ratio at at least one reference point; wherein the LSC color values are only provided for points corresponding to one or more specified clusters of blocks of smooth and uniform areas of the frame; and wherein the LSC color values are formed into a vector Y, and the parameter variable values are formed into a matrix A both used in an equation to determine a vector of the parameter values. Generating parameter variable values comprises forming a matrix wherein each row or column represents one of the plurality of points with a LSC color value, and wherein the other of the row or column of the matrix represents a variable order and position in the function to be multiplied by a corresponding parameter; wherein the function includes parameters $\hat{b}_1$ to $\hat{b}_6$, and wherein 1, $x_1$, $x_2$, $x_1 x_2$, $x_1^2$, and $x_2^2$ are variable order and positions that are respectively multiplied by the parameters to form products, and wherein the products are summed in any order, and $x_1$, $x_2$ are the horizontal and vertical point coordinates respectively, and on the statistics grid; and wherein computing the lens shading correction factors comprises entering point coordinates into the function with the parameter values filled into the function to compute the correction factor for a point.

The LSC unit also to validate the correction factor by determining whether one or more of the parameters have a positive or negative value; and proportionally apply the correction factor to the same corresponding point in multiple lens shading correction tables each associated with a different illuminant and for the same frame, and proportionally depending on weights applied to each lens shading correction table, wherein the weights are formed by using one or more specified clusters of image data that are associated with smooth and uniform areas of the frame.

By one approach, at least one computer readable medium comprises a plurality of instructions that in response to being executed on a computing device, causes the computing device to: obtain at least one statistics grid of pixel data spatially corresponding to a frame; determine a reference point on the statistics grid depending on color shading attenuation of the image data; generate LSC color values of a plurality of points on the statistics grid, wherein each LSC color value is associated with a color-related value from one of the plurality of points and a color-related value at the reference point; generate parameter variable values associated with a function and for each of the plurality of points with an LSC color value; determine parameter values of the function using the parameter variable values and the LSC color values; and compute lens shading correction factors for the plurality of points by using the function with the parameter values inserted into the function.

By another example, the computing device includes that the reference point is the point on the statistics grid with the lowest color attenuation; wherein the reference point is selected from locations corresponding to at least one cluster of blocks associated with a smooth and uniform area of the frame, wherein the reference point is the point within the cluster(s) that is the closest to a center of the statistics grid or frame; and wherein the blocks form a cluster by having luminance or color shading values of the block or at least one pixel point in the block that meet a criteria. The instructions include that each LSC color value is associated with a color ratio of a different point on the statistics grid; wherein each LSC color value is computed as a color ratio at a point on the statistics grid divided by a color ratio at at least one reference point; wherein the LSC color values are only provided for points corresponding to one or more specified clusters of blocks of smooth and uniform areas of the frame; and wherein the LSC color values are formed into a vector Y, and the parameter variable values are formed into a matrix A both used in an equation to determine a vector of the parameter values. Generating parameter variable values comprises forming a matrix wherein each row or column represents one of the plurality of points with a LSC color value, and wherein the other of the row or column of the matrix represents a variable order and position in the function to be multiplied by a corresponding parameter; wherein the function includes parameters $\hat{b}_1$ to $\hat{b}_6$, and wherein 1, $x_1$, $x_2$, $x_1 x_2$, $x_1^2$, and $x_2^2$ are variable order and positions that are respectively multiplied by the parameters to form products, and wherein the products are summed in any order, and $x_1$, $x_2$ are the horizontal and vertical point coordinates respectively, and on the statistics grid; and wherein computing the lens shading correction factors comprises entering point coordinates into the function with the parameter values filled into the function to compute the correction factor for a point.

By other approaches, the instructions cause the computing device to validate the correction factor by determining whether one or more of the parameters have a positive or negative value; and proportionally apply the correction factor to the same corresponding point in multiple lens shading correction tables each associated with a different illuminant and for the same frame, and proportionally depending on weights applied to each lens shading correction table, wherein the weights are formed by using one or more specified clusters of image data that are associated with smooth and uniform areas of the frame.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of lens shading correction (LSC), comprising:
    obtaining at least one statistics grid of pixel data spatially corresponding to a frame;
    determining a reference point on the statistics grid depending on color shading data of the frame;
    generating LSC color values of a plurality of points on the statistics grid, wherein each LSC color value is associated with a color-related value from one of the plurality of points and a color-related value at the reference point;
    generating parameter variable values associated with a function and for each of the plurality of points with an LSC color value;
    determining parameter values of the function using the parameter variable values and the LSC color values; and
    computing lens shading correction factors for the plurality of points by using the function with the parameter values inserted into the function,
    wherein the LSC color values are only provided for points corresponding to one or more specified clusters of blocks of smooth and uniform areas of the frame.

2. The method of claim 1 wherein the reference point is the point on the statistics grid with the lowest color attenuation.

3. The method of claim 1 wherein the reference point is selected from locations corresponding to at least one cluster of blocks associated with a smooth and uniform area of the frame, wherein the reference point is the point within the cluster(s) that is the closest to a center of the statistics grid or frame.

4. The method of claim 3 wherein the blocks form a cluster by having luminance or color shading values of the block or at least one pixel point in the block that meet a criteria.

5. The method of claim 1 wherein each LSC color value is associated with a color ratio of a different point on the statistics grid.

6. The method of claim 1 wherein each LSC color value is computed as a color ratio at a point on the statistics grid divided by a color ratio at at least one reference point.

7. The method of claim 1 wherein the LSC color values are formed into a vector Y, and the parameter variable values are formed into a matrix A both used in an equation to determine a vector of the parameter values.

8. The method of claim 1 wherein generating parameter variable values comprises forming a matrix wherein each row or column represents one of the plurality of points with a LSC color value, and wherein the other of the row or column of the matrix represents a variable order and position in the function to be multiplied by a corresponding parameter.

9. The method of claim 1 wherein the function includes parameters $\hat{b}_1$ to $\hat{b}_6$, and wherein $1, x_1, x_2, x_1 x_2, x_1^2$, and $x_2^2$ are variable order and positions that are respectively multiplied by the parameters to form products, and wherein the products are summed in any order, and $x_1, x_2$ are the horizontal and vertical point coordinates respectively, and on the statistics grid.

10. The method of claim 9 wherein computing the lens shading correction factors comprises entering point coordinates into the function with the parameter values filled into the function to compute the correction factor for a point.

11. The method of claim 1 comprising validating the correction factor by determining whether one or more of the parameters have a positive or negative value.

12. The method of claim 1 comprising proportionally applying the correction factor to the same corresponding point in multiple lens shading correction tables each associated with a different illuminant and for the same frame, and proportionally depending on weights applied to each lens shading correction table.

13. The method of claim 12 wherein the weights are formed by using one or more specified clusters of image data that are associated with smooth and uniform areas of the frame.

14. The method of claim 1 wherein the reference point is the point on the statistics grid with the lowest color attenuation;
    wherein the reference point is selected from locations corresponding to at least one cluster of blocks associated with a smooth and uniform area of the frame, wherein the reference point is the point within the cluster(s) that is the closest to a center of the statistics grid or frame;
    wherein the blocks form a cluster by having luminance or color shading values of the block or at least one pixel point in the block that meet a criteria;
    wherein each LSC color value is associated with a color ratio of a different point on the statistics grid;
    wherein each LSC color value is computed as a color ratio at a point on the statistics grid divided by a color ratio at at least one reference point;
    wherein the LSC color values are formed into a vector Y, and the parameter variable values are formed into a matrix A both used in an equation to determine a vector of the parameter values;
    wherein generating parameter variable values comprises forming a matrix wherein each row or column represents one of the plurality of points with a LSC color value, and wherein the other of the row or column of the matrix represents a variable order and position in the function to be multiplied by a corresponding parameter;
    wherein the function includes parameters $\hat{b}_1$ to $\hat{b}_6$, and wherein $1, x_1, x_2, x_1 x_2, x_1^2$, and $x_2^2$ are variable order and positions that are respectively multiplied by the parameters to form products, and wherein the products are summed in any order, and $x_1$, $x_2$ are the horizontal and vertical point coordinates respectively, and on the statistics grid;

wherein computing the lens shading correction factors comprises entering point coordinates into the function with the parameter values filled into the function to compute the correction factor for a point;

the method comprising:
   validating the correction factor by determining whether one or more of the parameters have a positive or negative value; and
   proportionally applying the correction factor to the same corresponding point in multiple lens shading correction tables each associated with a different illuminant and for the same frame, and proportionally depending on weights applied to each lens shading correction table, wherein the weights are formed by using one or more specified clusters of image data that are associated with smooth and uniform areas of the frame.

15. A computer-implemented system of lens shading correction (LSC), comprising:
   a display;
   at least one processor communicatively coupled to the display;
   at least one memory communicatively coupled to at least one processor and storing image capture data of at least one frame of a video sequence or at least one still photograph; and
   at least one lens shading correction (LSC) unit communicatively coupled to the processor, and to:
      obtain at least one statistics grid of pixel data spatially corresponding to a frame;
      determine a reference point on the statistics grid depending on color shading attenuation of the image data;
      generate LSC color values of a plurality of points on the statistics grid, wherein each LSC color value is associated with a color-related value from one of the plurality of points and a color-related value at the reference point;
      generate parameter variable values associated with a function and for each of the plurality of points with an LSC color value;
      determine parameter values of the function using the parameter variable values and the LSC color values; and
      compute lens shading correction factors for the plurality of points by using the function with the parameter values inserted into the function, wherein the LSC color values are formed into a vector, and the parameter variable values are formed into a matrix both used in an equation to determine a vector of the parameter values.

16. The system of claim 15 wherein the reference point is the point on the statistics grid with the lowest color attenuation.

17. The system of claim 15 wherein the reference point is selected from locations corresponding to at least one cluster of blocks associated with a smooth and uniform area of the frame, wherein the reference point is the point within the cluster(s) that is the closest to a center of the statistics grid or frame.

18. The system of claim 17 wherein the blocks form a cluster by having luminance or color shading values of the block or at least one pixel points in the block that meet a criteria.

19. The system of claim 15 wherein each LSC color value is associated with a color ratio of a different point on the statistics grid.

20. The system of claim 15 wherein each LSC color value is computed as a color ratio at a point on the statistics grid divided by a color ratio at at least one reference point.

21. The system of claim 15 wherein the reference point is the point on the statistics grid with the lowest color attenuation;
   wherein the reference point is selected from locations corresponding to at least one cluster of blocks associated with a smooth and uniform area of the frame, wherein the reference point is the point within the cluster(s) that is the closest to a center of the statistics grid or frame;
   wherein the blocks form a cluster by having luminance or color shading values of the block or at least one pixel point in the block that meet a criteria;
   wherein each LSC color value is associated with a color ratio of a different point on the statistics grid;
   wherein each LSC color value is computed as a color ratio at a point on the statistics grid divided by a color ratio at at least one reference point;
   wherein the LSC color values are only provided for points corresponding to one or more specified clusters of blocks of smooth and uniform areas of the frame;
   wherein generating parameter variable values comprises forming a matrix wherein each row or column represents one of the plurality of points with a LSC color value, and wherein the other of the row or column of the matrix represents a variable order and position in the function to be multiplied by a corresponding parameter;
   wherein the function includes parameters $\hat{b}_1$ to $\hat{b}_6$, and wherein 1, $x_1$, $x_2$, $x_1 x_2$, $x_1^2$, and $x_2^2$ are variable order and positions that are respectively multiplied by the parameters to form products, and wherein the products are summed in any order, and $x_1$, $x_2$ are the horizontal and vertical point coordinates respectively, and on the statistics grid;
   wherein computing the lens shading correction factors comprises entering point coordinates into the function with the parameter values filled into the function to compute the correction factor for a point;
   the LSC unit to:
      validate the correction factor by determining whether one or more of the parameters have a positive or negative value; and
      proportionally apply the correction factor to the same corresponding point in multiple lens shading correction tables each associated with a different illuminant and for the same frame, and proportionally depending on weights applied to each lens shading correction table, wherein the weights are formed by using one or more specified clusters of image data that are associated with smooth and uniform areas of the frame.

22. At least one non-transitory computer readable medium comprising a plurality of instructions that in response to being executed on a computing device, causes the computing device to:
   obtain at least one statistics grid of pixel data spatially corresponding to a frame;
   determine a reference point on the statistics grid depending on color shading attenuation of the image data;
   generate LSC color values of a plurality of points on the statistics grid, wherein each LSC color value is associated with a color-related value from one of the plurality of points and a color-related value at the reference point;

generate parameter variable values associated with a function and for each of the plurality of points with an LSC color value;

determine parameter values of the function using the parameter variable values and the LSC color values; and compute lens shading correction factors for the plurality of points by using the function with the parameter values inserted into the function, wherein the LSC color values are only provided for points corresponding to one or more specified clusters of blocks of smooth and uniform areas of the frame.

23. The medium of claim 22 wherein the reference point is the point on the statistics grid with the lowest color attenuation;

wherein the reference point is selected from locations corresponding to at least one cluster of blocks associated with a smooth and uniform area of the frame, wherein the reference point is the point within the cluster(s) that is the closest to a center of the statistics grid or frame;

wherein the blocks form a cluster by having luminance or color shading values of the block or at least one pixel point in the block that meet a criteria;

wherein each LSC color value is associated with a color ratio of a different point on the statistics grid;

wherein each LSC color value is computed as a color ratio at a point on the statistics grid divided by a color ratio at at least one reference point;

wherein the LSC color values are formed into a vector Y, and the parameter variable values are formed into a matrix A both used in an equation to determine a vector of the parameter values;

wherein generating parameter variable values comprises forming a matrix wherein each row or column represents one of the plurality of points with a LSC color value, and wherein the other of the row or column of the matrix represents a variable order and position in the function to be multiplied by a corresponding parameter;

wherein the function includes parameters $\hat{b}_1$ to $\hat{b}_6$, and wherein 1, $x_1$, $x_2$, $x_1 x_2$, $x_1^2$, and $x_2^2$ are variable order and positions that are respectively multiplied by the parameters to form products, and wherein the products are summed in any order, and $x_1$, $x_2$ are the horizontal and vertical point coordinates respectively, and on the statistics grid;

wherein computing the lens shading correction factors comprises entering point coordinates into the function with the parameter values filled into the function to compute the correction factor for a point;

the instructions causing the computing device to:

validate the correction factor by determining whether one or more of the parameters have a positive or negative value; and proportionally apply the correction factor to the same corresponding point in multiple lens shading correction tables each associated with a different illuminant and for the same frame, and proportionally depending on weights applied to each lens shading correction table, wherein the weights are formed by using one or more specified clusters of image data that are associated with smooth and uniform areas of the frame.

\* \* \* \* \*